United States Patent
Spittle et al.

(10) Patent No.: US 9,199,859 B2
(45) Date of Patent: Dec. 1, 2015

(54) WATER PURIFICATION DEVICE

(71) Applicant: PROCLEANSE LLC, Buffalo Grove, IL (US)

(72) Inventors: Kevin S. Spittle, Vero Beach, FL (US); Frederick R. Segal, Beaver Falls, PA (US); Michael Robeson, Loveland, CO (US); Jessie Clark, Granite Falls, NC (US); John A. Schoch, Jr., Naperville, IL (US); Gary Lane Bowers, Jonesborough, TN (US)

(73) Assignee: PROCLEANSE LLC, Buffalo Grove, IL (US)

( * ) Notice: Subject to any disclaimer, the term of this patent is extended or adjusted under 35 U.S.C. 154(b) by 149 days.

(21) Appl. No.: 13/783,862

(22) Filed: Mar. 4, 2013

(65) Prior Publication Data
US 2013/0175222 A1    Jul. 11, 2013

Related U.S. Application Data

(63) Continuation-in-part of application No. PCT/US2011/050133, filed on Sep. 1, 2011.

(60) Provisional application No. 61/379,779, filed on Sep. 3, 2010.

(51) Int. Cl.
*C02F 1/52* (2006.01)
*C02F 1/00* (2006.01)
(Continued)

(52) U.S. Cl.
CPC .............. *C02F 1/001* (2013.01); *C02F 1/004* (2013.01); *C02F 1/50* (2013.01); *C02F 1/281* (2013.01);
(Continued)

(58) Field of Classification Search
CPC ............ C02F 1/004; C02F 1/50; C02F 1/001; C02F 1/281; C02F 1/283; C02F 1/66; C02F 3/04; C02F 2001/425; C02F 1/505; C02F 2101/103; C02F 2101/14
USPC .................. 210/255, 283, 257.1, 501
See application file for complete search history.

(56) References Cited

U.S. PATENT DOCUMENTS 2,017,456 A * 10/1935 Gudmundsen ............... 210/284
2,087,157 A *  7/1937 Lind .............................. 141/2
(Continued)

FOREIGN PATENT DOCUMENTS

CN      1090554 A      8/1994
CN      2586692        11/2003
(Continued)

OTHER PUBLICATIONS

Mengel, Fundamentals of Soil Cation Exchange Capacity (CEC), Jul. 2010, Agronomy Guide, Purdue University Cooperative Extension Service, four pages, [online], [retrieved on Apr. 23, 2015]. Retrieved from the internet <URL:http//www.extension.purdue.edu/exmedia/ay/ay-238.html>.*
(Continued)

*Primary Examiner* — Matthew O Savage
(74) *Attorney, Agent, or Firm* — Brooks Kushman P.C.

(57) ABSTRACT

A water purification device includes a housing including a first chamber in communication with a second chamber, a first filtration stage, and a second filtration stage. The first chamber has the first filtration stage and the second filtration stage. The filtration stages and chambers are arranged in a serial relationship to another filtration stage and chamber, respectively. The first filtration stage includes particles and the second filtration stage includes a biocide. At least 95 percent of the particles will pass through about 20,000 micron screen and at least 95 percent will not pass thru about 20 micron screen. The particles have a cation exchange capacity of 1 to 200 milli-equivalents per 100 grams. The particles will become charged and have a charge of about 1 to about 500 millivolts with ions from the biocide when the device is filled with water.

52 Claims, 23 Drawing Sheets

(51) Int. Cl.
  *C02F 1/50* (2006.01)
  *C02F 1/28* (2006.01)
  *C02F 1/66* (2006.01)
  *C02F 3/04* (2006.01)
  *C02F 1/42* (2006.01)

(52) U.S. Cl.
  CPC ............... *C02F 1/283* (2013.01); *C02F 1/505* (2013.01); *C02F 1/66* (2013.01); *C02F 3/04* (2013.01); *C02F 2001/425* (2013.01); *Y02W 10/15* (2015.05)

(56) References Cited

U.S. PATENT DOCUMENTS

| | | | | |
|---|---|---|---|---|
| 4,451,361 | A | * | 5/1984 | Paterson ........................ 210/136 |
| 4,632,876 | A | * | 12/1986 | Laird et al. .................... 428/404 |
| 4,765,892 | A | | 8/1988 | Hulbert et al. |
| 5,011,602 | A | * | 4/1991 | Totani et al. .................. 210/484 |
| 5,143,611 | A | | 9/1992 | Pate, Jr. |
| 5,149,437 | A | | 9/1992 | Wilkinson et al. |
| 5,156,335 | A | * | 10/1992 | Smith et al. ..................... 239/33 |
| 5,186,830 | A | | 2/1993 | Rait |
| 5,236,595 | A | | 8/1993 | Wang et al. |
| 5,269,919 | A | | 12/1993 | Von Medlin |
| 5,562,824 | A | | 10/1996 | Magnusson |
| 5,980,752 | A | | 11/1999 | Bowers |
| 6,245,701 | B1 | | 6/2001 | Sato |
| 6,344,146 | B1 | | 2/2002 | Moorehead et al. |
| 8,607,992 | B2 | | 12/2013 | Farrelly et al. |
| 2004/0050799 | A1 | * | 3/2004 | Hansen et al. ................. 210/764 |
| 2004/0251210 | A1 | | 12/2004 | Fritze et al. |
| 2012/0091070 | A1 | | 4/2012 | Sjauta et al. |

FOREIGN PATENT DOCUMENTS

| | | | |
|---|---|---|---|
| CN | 1621357 | | 6/2005 |
| CN | 1656027 | | 8/2005 |
| CN | 2845441 | Y | 12/2006 |
| CN | 2930825 | | 8/2007 |
| CN | 201099647 | Y | 8/2008 |
| CN | 101484388 | | 7/2009 |
| CN | 101484388 | A | 7/2009 |
| CN | 201411394 | Y | 2/2010 |
| CN | 201560156 | | 8/2010 |
| EP | 0930283 | | 7/1999 |
| WO | 0154786 | | 8/2001 |
| WO | 2007144160 | | 12/2007 |
| WO | WO 2010044769 | A1 * | 4/2010 ............... C02F 1/50 |

OTHER PUBLICATIONS

Johnson, Technical Report on nextSand Filter media, Jun. 2004 [online], [retrieved on Apr. 24, 2015]. Retrieved from the internet <URL:http://www.nextsand.com/tech-doc.html>.*
Third Chinese Office Action Dated Dec. 23, 2014, Application No. 201180003882.1, 15 Pages.
Chinese Office Action for CN 201180003882.1, Dated Aug. 11, 2014, 13 Pages.
Chinese Office Action for CN 201180003882.1, Dated Dec. 18, 2013, 13 Pages.
International Search Report for PCT/US2011/050133, Completed by the US Patent and Trademark Office on Mar. 5, 2012, 4 Pages.
CN 201410193444.1 First Office Action of corresponding Chinese Application; dated Feb. 4, 2015; 7 pages.
Chinese Office Action Dated Jul. 20, 2015, Application No. 201180003882.1, 12 Pages.

* cited by examiner

WATER PURIFICATION DEVICE

CROSS-REFERENCE TO RELATED APPLICATIONS

This application is a continuation-in-part of U.S. national phase of PCT Application No. PCT/US2011/050133 filed Sep. 1, 2011 which claims the benefit of U.S. provisional Application No. 61/379,779 filed Sep. 3, 2010, the disclosures of which are incorporated in their entirety by reference herein.

TECHNICAL FIELD

One or more embodiments of the present invention relate to water purification device.

BACKGROUND

There has been a constant need for improved drinking water, particularly for remote areas of the developing world where people live without access to safe water for drinking, cooking and bathing. Lack of clean water contributes to pediatric diarrheal diseases and associated casualties, among others.

Accordingly, there is a need for improved water purification devices for home use and large scale water purification use.

SUMMARY

The present invention solves one or more problems of the prior art by providing in at least one embodiment a water purification device that purifies water. A water purification device is contained within a housing having a plurality of chambers, including a first chamber and a second chamber. The chambers are arranged in a serial relationship to another chamber. A plurality of filtration stages, including a first filtration stage and a second filtration stage are contained within the water purification device. The water filtration stages are arranged in a serial relationship to another filtration stage. The first filtration stage includes inorganic particles. The second filtration stage includes a biocide. The inorganic particles have a size range where at least 95 percent of the porous ceramic particles will pass thru about 20,000 micron screen and at least 95 percent will not pass thru about 20 micron screen. Further, the inorganic particles have a cation exchange capacity of 1 to 200 milli-equivalent per 100 grams. The second filtration stage includes a biocide. The inorganic particles will become charged with ions from the biocide when the device is filled with water. Moreover, the first chamber is in communication with a second chamber. Water purified using the water purification device advantageously deactivates water-borne pathogens, bacteria, protists, viruses, and the like. The water purification device may be portable or stationary. The water within the device has a charge of about 1 to about 500 millivolts. The stationary version of the water purification device may be used for community use, or these devices can be termed community devices.

In another embodiment, a water purification device is contained within a housing having a plurality of chambers, including a first chamber and a second chamber. The chambers are arranged in a serial relationship to another chamber. A plurality of filtration stages are arranged in a serial relationship to another filtration stage. The first chamber having a plurality of filtration stages, including a first filtration stage and a second filtration stage are contained within the water purification device. The water filtration stages include a first filtration stage, a second filtration stage, a third filtration stage, and a fourth filtration stage. The first filtration stage includes porous ceramic particles. The second filtration stage includes a biocide. The second filtration stage includes porous ceramic particles and a biocide. The third filtration stage includes a biocide. The fourth filtration stage includes porous ceramic particles. The porous ceramic particles have a size range where at least 95 percent of the porous ceramic particles will pass thru about 12,700 micron screen and at least 95 percent will not pass thru about 51 micron screen. The porous ceramic particles have an average pore size ranging from about 0.1 to about 20 microns. Further, the porous ceramic particles having a cation exchange capacity of 1 to 200 milli-equivalent per 100 grams. The second filtration stage includes a biocide. The porous ceramic particles will become charged with ions from the biocide when the device is filled with water. Moreover, the first chamber is in communication with a second chamber.

A water purification device is contained within a housing having a plurality of chambers, including a first chamber and a second chamber. The chambers are arranged in a serial relationship to another chamber. A plurality of filtration stages, including a first filtration stage and a second filtration stage are contained within the water purification device. The water filtration stages are arranged in a serial relationship to another filtration stage. The first filtration stage includes porous ceramic particles. The second filtration stage includes a biocide. The porous ceramic particles have a size range where at least 95 percent of the porous ceramic particles will pass thru about 12,700 micron screen and at least 95 percent will not pass thru about 51 micron screen. Further, the porous ceramic particles having a cation exchange capacity of 1 to 200 milli-equivalent per 100 grams. The second filtration stage includes a biocide. The porous ceramic particles will become charged with ions from the biocide when the device is filled with water.

In another aspect, a water purification media kit is provided including porous ceramic particles, and biocide. The porous ceramic particles have a size range in which at least 95 percent will pass through about 20,000 micron screen and at least 95 percent will not pass thru about 20 micron screen. The porous ceramic particles having a cation exchange capacity of 1 to 200 milli-equivalent per 100 grams. The biocide includes at least one component selected from the group consisting of zinc, ground zinc, zinc alloys, zinc chloride, zinc oxide, silver, ground silver, silver alloys, colloidal silver, silver nitrate, silver dehydrate, copper, ground copper, copper alloys, copper sulfate, brass, iodine, a cation detergent, benzalkonium chloride, cetylpyridinium chloride, sorbic acid, benzoic acid, organic acid, bromine, nickel, aluminum, halogen and combinations thereof.

DETAILED DESCRIPTION

Figures 1A, 1B:
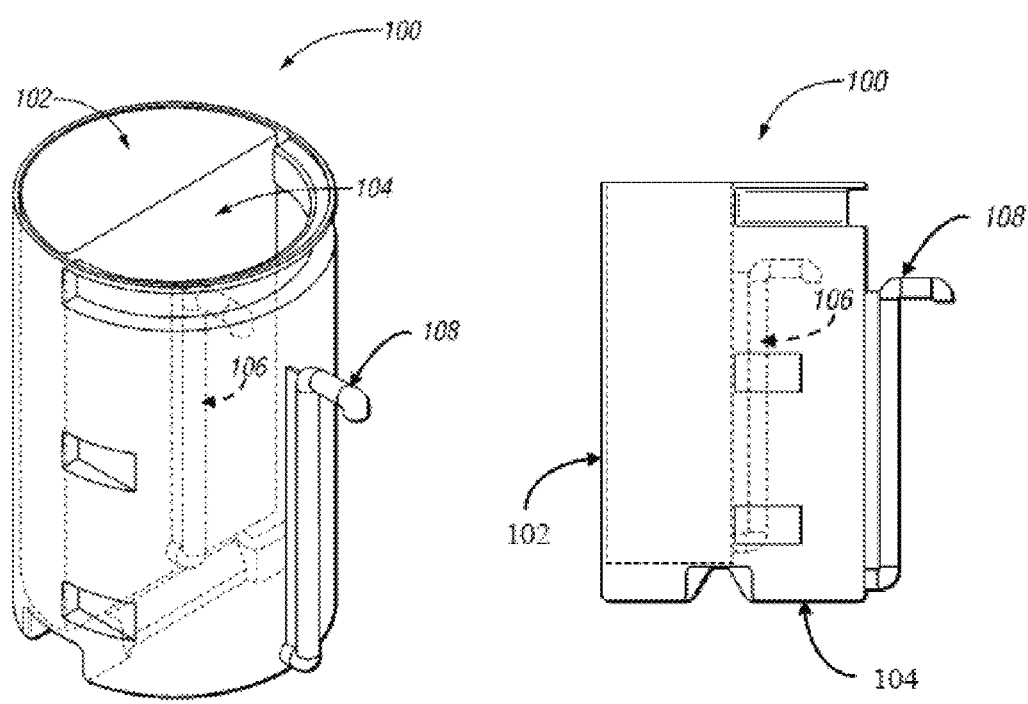
FIGS. 1A-1J depict various views of a water purification device in one or more embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities in the description and in the claims are to be understood as modified by the word "about" in describing the broader scope of this invention. Unless expressly stated to the contrary, the description of a group or class of material is suitable or preferred for a given purpose in connection with the invention implies that mixtures of any two or more members of the group or class may be equally suitable or preferred.

In one or more embodiments, the present invention provides a cost-efficient and environmental friendly water purification device particularly suitable for "point of use" applications in the household water treatment sector. As will be detailed below, the water purification device filters and treats raw water to produce drinking and cooking water for individual families and particularly for a family of 4 to 6. The water purification device may be presented in a portable singular device and may be placed wherever drinking and cooking water consumption is desirable. Moreover, the water purification device may be designed and constructed to be operable independent of external support of energy such as electrical energy. Thus, the water purification device may be used in certain parts of the developing world in need of drinking water yet with limited sources of energy.

In one or more embodiments, the term "raw water" or "waste water" refers to a water source that may contain various types of organic matter, sediment, and/or disease-causing pathogens. Non-limiting examples of the disease-causing pathogens include bacteria, viruses, protozoa, and helminthes (parasitic worms).

In one or more embodiments, the term "inorganic particles" as used herein refers to: (i) porous ceramic particles; and, (ii) inorganic non-ceramic particles which include one or more types of porous particles such as smectite clay, perlite, sand, vermiculite, zeolite, Fuller's earth, diatomatious earth, shale, and combinations thereof.

In one or more embodiments, the inorganic particles are referred to as a mesh screen size. The standard used herein is the Tyler mesh size. Tyler mesh size is the number of openings per (linear) inch of mesh. Inorganic particles are sometimes described as having a certain mesh size (e.g. 5 mesh porous ceramic particle). Inorganic particles may be referred to a size range from the percentage of particles that pass through a mesh screen and the percentage of particles that are retained on a mesh screen. This particular designation will indicate that a particle will pass through some specific mesh (that is, have a maximum size; larger pieces won't fit through this mesh) but will be retained by some specific tighter mesh (that is, a minimum size; pieces smaller than this will have passed through the mesh). This type of description establishes a range of particle sizes. For example, a "5×30": particles pass no less than 95 percent on a number #5 sieve and retain no less than 95 percent on a number #30 sieve are alternatively termed "5×30" particles.

Figure 1C:
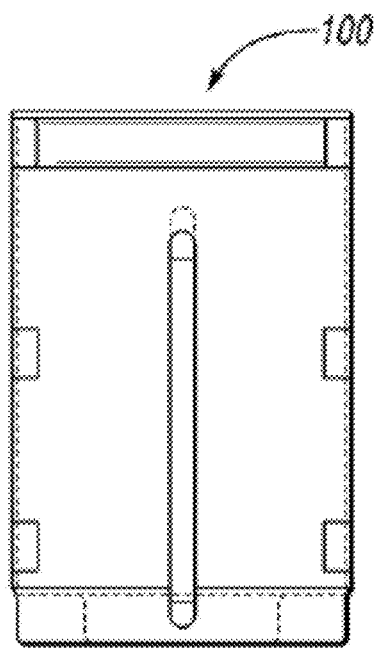
Figure 1D:
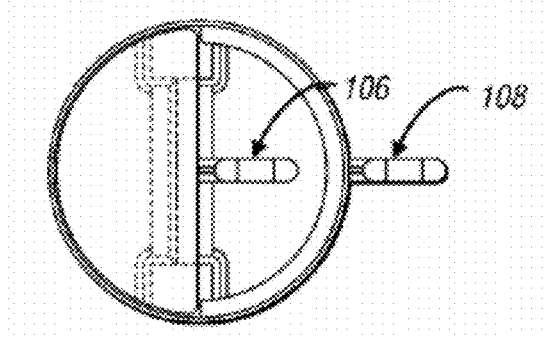

According to one aspect of the present invention, and as depicted in FIGS. 1A-1J, a water purification device is generally shown at 100. FIG. 1A illustratively depicts a perspective view of the water purification device 100. FIG. 1B illustratively depicts a cross-sectional view of the water purification device 100. FIG. 1C illustratively depicts another cross-sectional view of the water purification device 100. FIG. 1D illustratively depicts a top view of the water purification device 100. As will be detailed herein elsewhere, the water purification device 100 can be of any suitable shape, and is not limited to the cylindrical shape depicted in FIGS. 1A-1D.

Figure 1E:
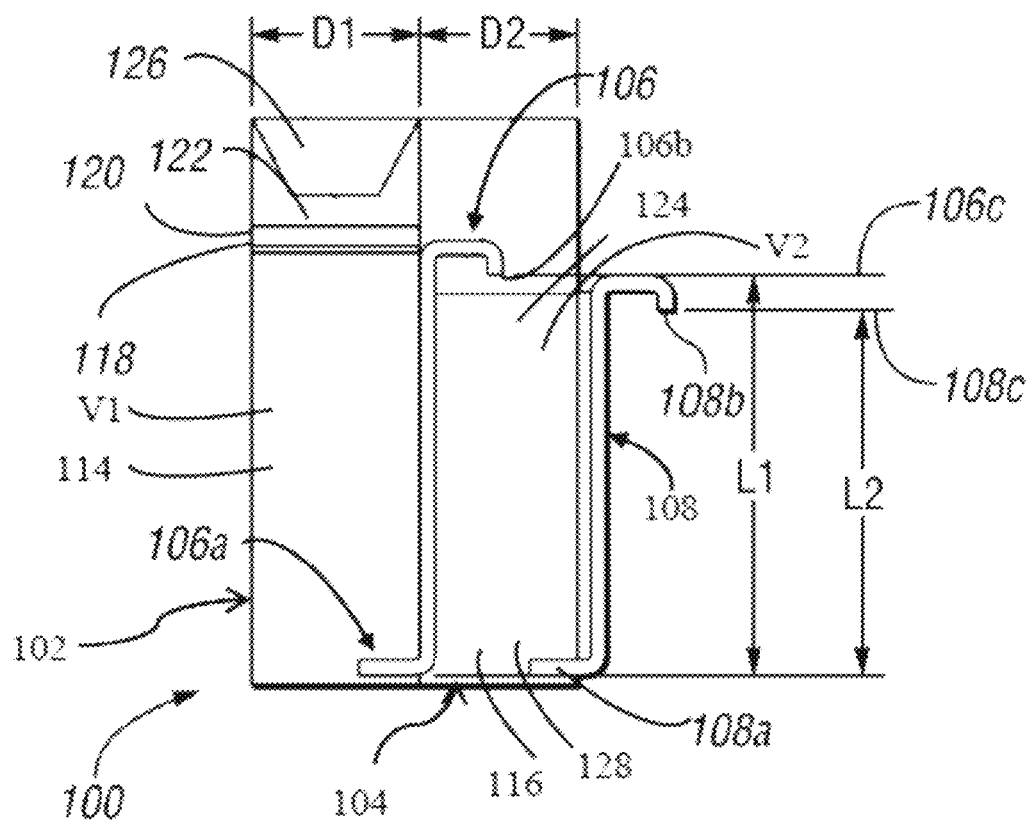

FIG. 1E depicts an enlarged view of FIG. 1B to show various structural elements with greater clarity. As depicted in FIG. 1E, the water purification device 100 includes a first chamber 102 including a first plurality of porous ceramic particles 114 or inorganic non-ceramic-particles 116; and a second chamber 104 in water communication with the first chamber 102. In yet another embodiment, the second chamber 104 includes a second plurality of porous ceramic particles 114 or inorganic non-ceramic-particles 116.

In one or more embodiments, the first chamber 102 optionally refers to a bio-remediation chamber or a first ($1^{st}$) stage; and the second chamber 104 optionally refers to a biocidal-remediation chamber, or a second ($2^{nd}$) stage.

Figure 5A:
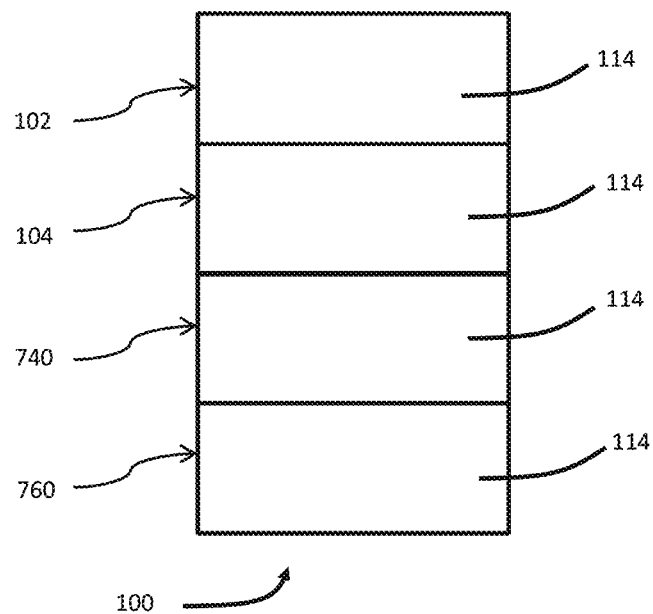
FIGS. 5A-5H depict various cross-sectional views of another variation to a water purification device.
Figure 5B:
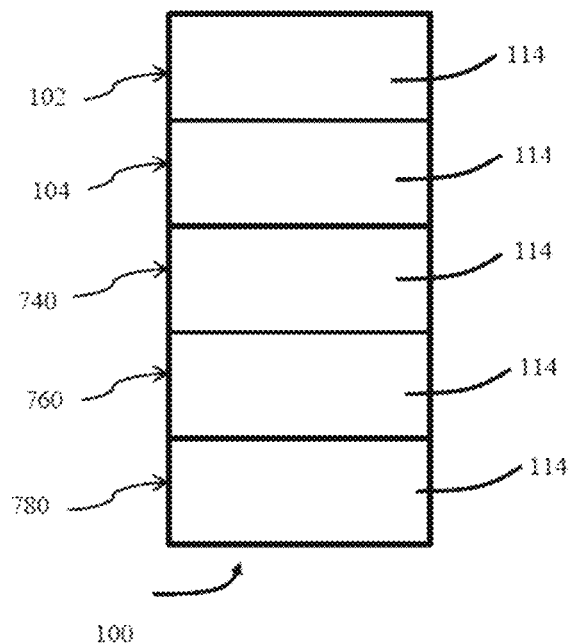
Figure 5C:
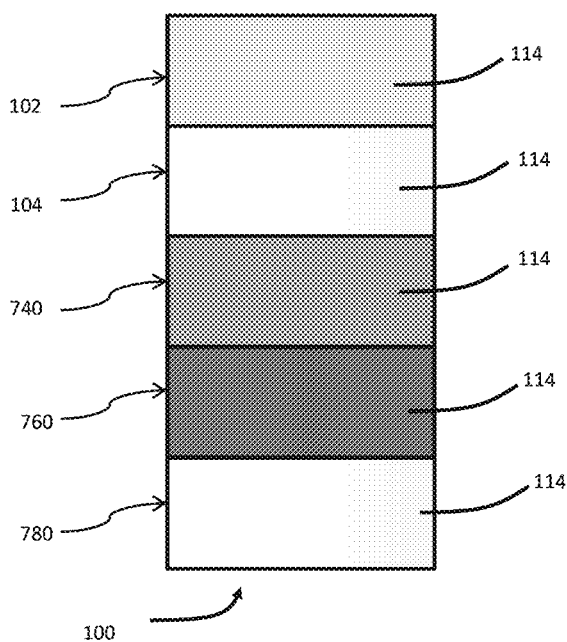
Figure 5D:
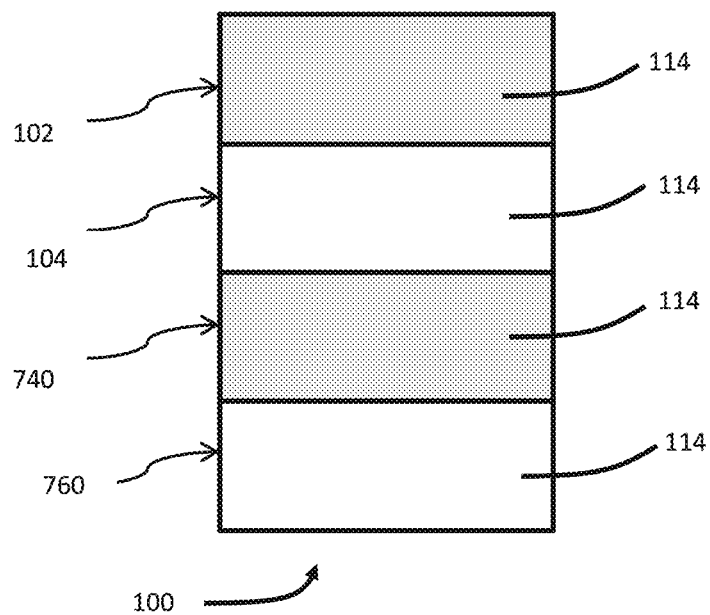
Figure 5E:
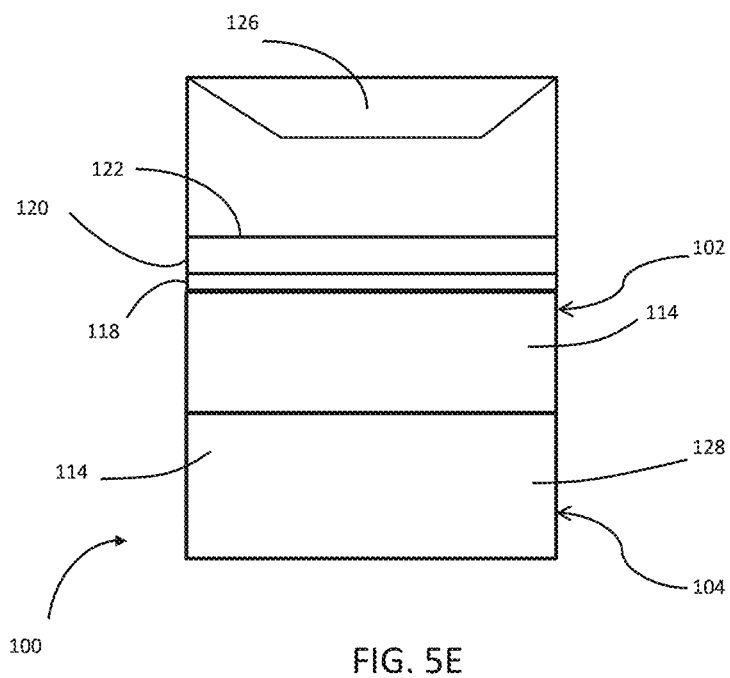
Figure 5F:
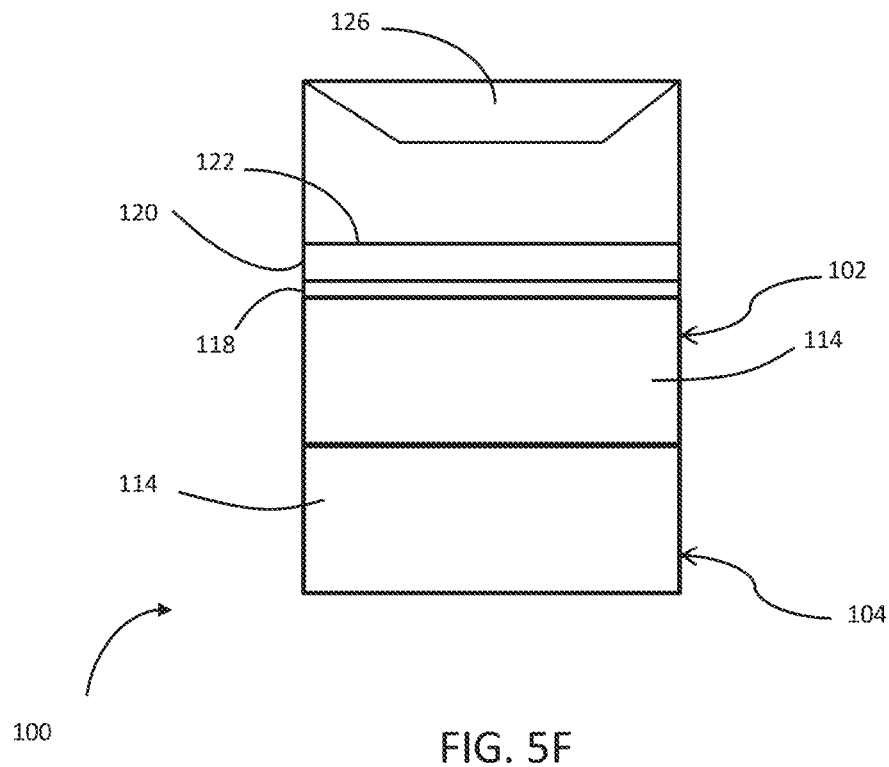
Figure 5G:
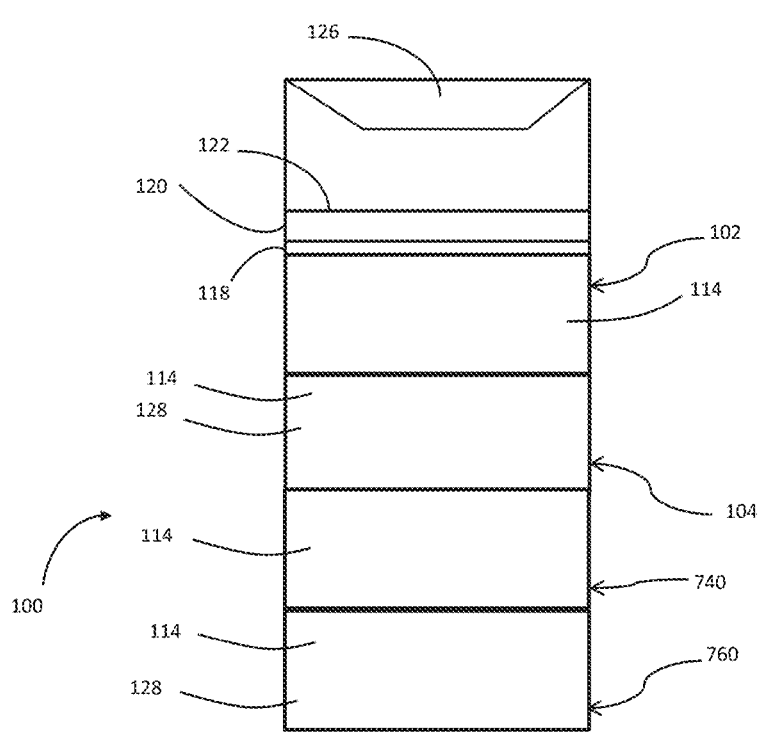
Figure 5H:
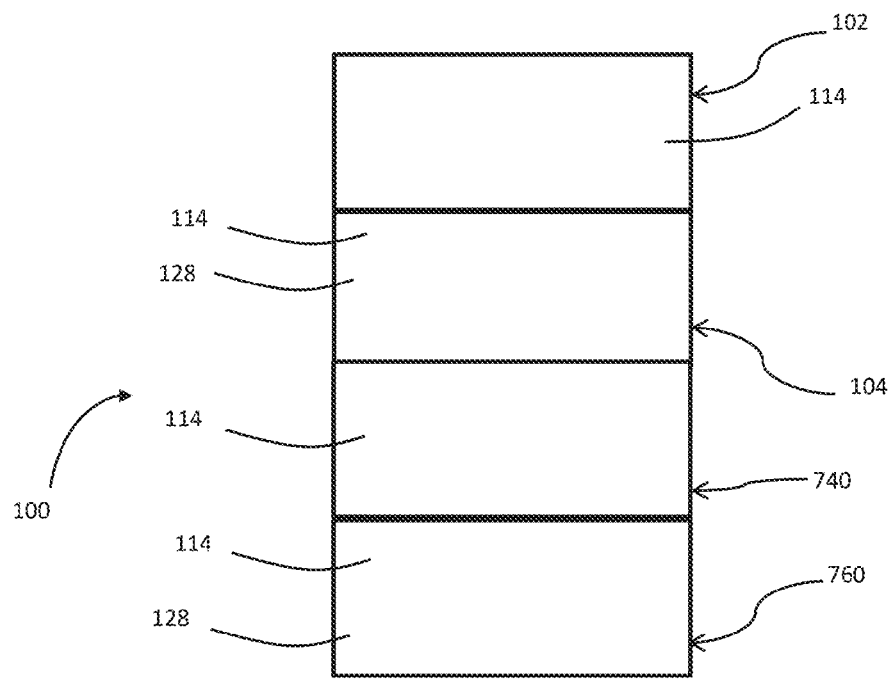
Figure 8:
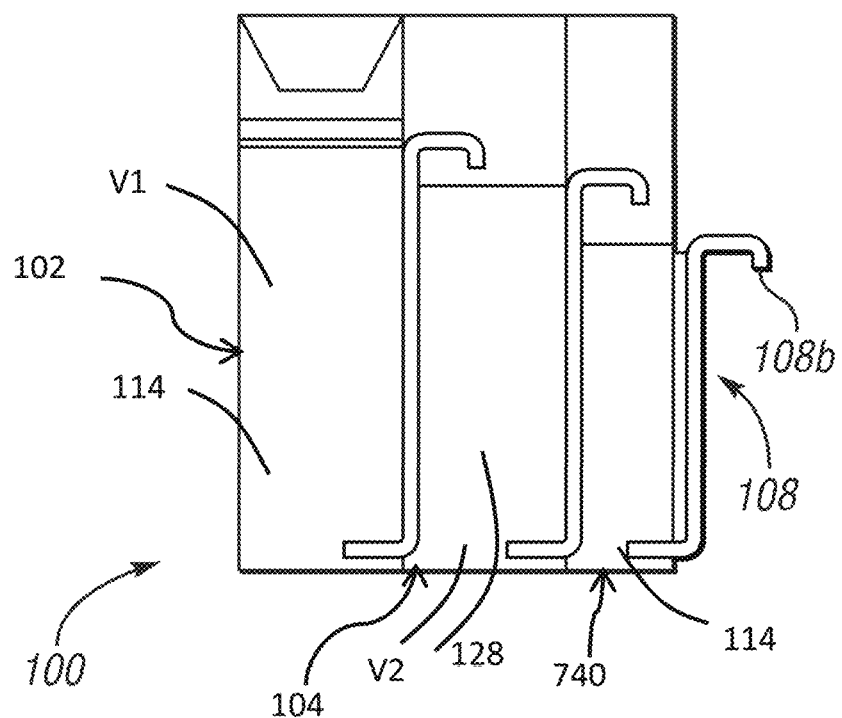
FIG. 8 depicts a cross-sectional view of a variation to a water purification device.

Although only one first chamber 102 and one second chamber 104 are specifically depicted in FIGS. 1A-1E, it is noted that the first/bio-mediation stage may optionally include two or more first chambers 102, and the second/biocidal stage may optionally include two or more second chambers 104. When employed, multiple first chambers 102 and/or second chambers 104 may be arranged in serial relationship to one another. For instance, and as depicted in FIG. 8, a water purification device generally shown at 100 varies from the water purification device of FIG. 1E by having a third chamber 740 downstream to and in water communication with the second chamber 104. Further, FIGS. 1I and 1J show a four chamber water purification device. FIGS. 1I and 1J have a third chamber 740 and a fourth chamber 760. Relative sizes between the first, second, and third chambers can be any suitable values dependent upon the particular water filtration project at hand. Generally, the three-chamber configuration according to FIG. 8 may be particularly suitable for treating raw water with added anti-microbial filtration and protection. More particularly a four chamber water purification device is suitable for treating raw water as depicted in FIGS. 1I and 1J. Even more particularly a five chamber water purification device is suitable for treating raw water as depicted in FIGS. 5B and 5C.

The first chamber 102 and the second chamber 104 may each independently be of any suitable shapes. Non-limiting examples of the suitable shapes for the first and second chambers 102, 104 include cylinders, elongated cylinders, cubes, elongated cubes, pyramids, elongated pyramids, rectangles, elongated rectangles, ovals, and elongated ovals.

Those skilled in the art appreciate that increasing the number of filtration stages and or the total surface area of the media within the filtration stages may have beneficial purification and/or effective microorganism killing characteristics. In yet another embodiment, the water filtration device has a plurality of filtration stages. A "filtration stage" as used herein may refer to a layer of media. The media may include porous ceramic particles 114, inorganic non-ceramic particles 116, biocide 128, toxic metal absorber, and pH modifier. A single chamber, such as chamber 1, may include multiple filtration stages. Referring to FIG. 11E, Chamber 1 includes a first filtration stage 820, a second filtration stage 830, a third filtration stage 840, and a fourth filtration stage 850. In another embodiment, a chamber may have only one media layer, which may be referred to as a filtration stage 820. Moreover, a water purification device may have a plurality of filtration stages in a single chamber, in each chamber, or in at least two chambers. In yet in another embodiment the water purification device has 30 filtration stages, 2 to about 4 filtration stages, about 3 to about 6 filtration stages, about 3 to about 10 filtration stages, about 3 to about 15 filtration stages, about 10 to about 20 filtration stages, about 10 to about 30 filtration stages, about 25 to about 50 filtration stages, about 25 to about 100 filtration stages, about 50 to about 1,000 filtration stages.

To obtain a significant log reduction of pathogenic or other harmful microorganisms from the waste water, a water purification device may have an increase volume range and/or the particle size of the media within the filtration stages. Either individually or in combination the combination of the desired media particle size and/or volume range in each filtration stage may give rise to effective killing or and purification characteristics. In yet another embodiment a chamber has at least two filtration stages, an upper filtration stage and a lower filtration stage, where the lower filtration stage has a larger average particle size than the upper filtration stage. In another embodiment, a chamber having four or more filtration stages, the filtration stage at the third position, which is third from the top of the chamber, may be referred to as both an upper filtration stage and a lower filtration stage, depending on the other filtration stage to be compared to. The term "particle" as used here refers to the media composition, where the media includes porous ceramic particles 114, inorganic non-ceramic-particles 116, biocide 128, toxic metal absorber and pH modifier. The term "particle-size" as used in at least one embodiment refers to whether a particle may pass or be retained on a mesh screen.

The volume range relationship for successive chambers and/or filtration stages may influence the water filtration device's ability to collect larger inorganic and organic matter that may not be trapped by the media pores. For example, a larger filtration stage 1 volume in relation to filtration stage 2 may drastically affect the devices' flow rate and dwell time since larger contaminating matter become trapped. In yet another embodiment a first filtration stage has a volume range of about 100 to about 450 cubic inches, about 100 to about 300 cubic inches, about 100 to about 200 cubic inches, about 200 to about 450 cubic inches, and about 300 to about 450 cubic inches. In yet another embodiment a second filtration stage has a volume range of about 300 to about 1200 cubic inches, about 300 to about 1000 cubic inches, about 300 to about 800 cubic inches, about 300 to about 700 cubic inches, about 500 to about 1200 cubic inches, about 800 to about 1200 cubic inches, and about 1000 to about 1200 cubic inches. In yet another embodiment a third filtration stage that has a volume range of about 1.5 to about 15 cubic inches, about 1.5 to about 10 cubic inches, about 1.5 to about 7.5 cubic inches, about 1.5 to about 5 cubic inches, about 1.5 to about 3 cubic inches, about 5 to about 15 cubic inches, and about 10 to about 15 cubic inches. In yet another embodiment a fourth filtration stage that has a volume range of about 150 to about 400 cubic inches, about 200 to about 400 cubic inches, about 300 to about 400 cubic inches, about 150 to about 350 cubic inches, about 150 to about 300 cubic inches, about 150 to about 250 cubic inches, and about 150 to about 200 cubic inches. In yet another embodiment a total range for all of the filtration stages has a volume range of about 300 to about 10,000 cubic inches, about 300 to about 3000 cubic inches, about 300 to about 2000 cubic inches, about 300 to about 1000 cubic inches, about 300 to about 750 cubic inches, about 500 to about 3000 cubic inches, and about 1000 to about 3000 cubic inches. In yet another embodiment a volume range of porous ceramic particles 114 of the first filtration stage 820 to the second filtration stage 840 is in the range about 1:1 to about 1:6, about 1:2 to about 1:3, and about 1:4 to about 1:5.5.

To obtain a significant log reduction of pathogenic or other harmful microorganisms from the waste water, a water purification device may have an increase number of chambers having media, an increase number of filtration stages, and/or increase the amount of filtration media that gives rise to effective killing or and purification characteristics. For example, in yet another embodiment, the first filtration stage has a layer density of about 0.01 to about 0.06 pounds per cubic inch, about 0.03 to about 0.06 pounds per cubic inch, 0.045 to about 0.06 pounds per cubic inch, 0.01 to about 0.05 pounds per cubic inch, and 0.01 to about 0.03 pounds per cubic inch. In yet another embodiment, the second filtration stage has a layer density of about 0.01 to about 0.06 pounds per cubic inch about 0.03 to about 0.06 pounds per cubic inch, 0.045 to about 0.06 pounds per cubic inch, 0.01 to about 0.05 pounds per cubic inch, and 0.01 to about 0.03 pounds per cubic inch. In yet another embodiment, a third filtration stage that has a layer density of about 0.035 to about 0.150 pounds per cubic inch, about 0.035 to about 0.100 pounds per cubic inch, about 0.035 to about 0.050 pounds per cubic inch, about 0.075 to about 0.150 pounds per cubic inch, and about 0.10 to about 0.150 pounds per cubic inch. In yet another embodiment, a fourth filtration stage that has a layer density of about 0.01 to about 0.05 pounds per cubic inch, about 0.03 to about 0.05 pounds per cubic inch, about 0.04 to about 0.05 pounds per cubic inch, about 0.01 to about 0.04 pounds per cubic inch, about 0.01 to about 0.03 pounds per cubic inch.

A volume relationship between each chamber or filtration stage may aid in the overall log reduction of pathogenic organisms from the waste water. For example, a volume relationship of chamber 1 to chamber 2 is about 1.2 to 1±30 percent, about 1.5 to 1±30 percent, about 2 to 1±30 percent, and about 3 to 1±30 percent. Those skilled in the art would know that the volume relationship of chamber 1 to chamber 2 given above may be applied to a water purification device having three or more chambers where the volume relationship is applied to any two chambers within the water purification device. In yet another embodiment, the first filtration stage and the second filtration stage have a water volume ratio about 0.8:1 or about 1:6, about 0.9:1 or about 1:5, about 1:1 or about 1:4, about 1.1:1 or about 1:3, about 1.2:1 or about 1:2, and about 1.3:1 or about 1:1.5. Those skilled in the art would know that the volume relationship of filtration stage 1 to filtration stage 2 given above may be applied to a water purification device having three or more filtration stages, where the volume relationship is applied to any two filtration stages within the water purification device.

A water purification device having a plurality of filtration stages may have intermixing of filtration stages between each adjacent filtration stage. The intermixing may include a portion of the particles moving from one filtration stage to another filtration stage. The intermixing may be due to the particle size differences between adjacent filtration stages where smaller particles may more easily move and shift into the adjacent filtration stage having a larger particle size. The intermixing of the filtration stages may be advantageous to simultaneously employ disparate filtration stages having particularized filtration and purification characteristics while also allowing a homogeneous purification and killing characteristics across the entire water purification device. The intermixing of layers may be about 75%, about 50%, about 40%, about 30%, about 25%, about 15%, about 10%, about 5%, and about 2%.

In yet another embodiment, and as depicted in FIG. 1E, the water purification device 100 further includes a first discharge conduit 106 having a first inlet 106a and a first outlet 106b, wherein water is transported from the first chamber 102 via the first inlet 106a to the second chamber 104 via the first outlet 106b. In certain instances, and as depicted in FIG. 1E, the first outlet 106b is positioned above the first inlet 106a with a first distance "L1" such that water inside the first chamber 102 is provided with a first pre-determined amount of dwell time prior to exiting out of the first chamber 102. In operation, and as depicted in FIG. 1E, as long as a top water surface 122 is maintained at or below the lowest point 106c of the first outlet 106b, there is no water discharge from the first chamber 102, to ensure a desirable dwell time for the water.

In yet another embodiment, and as depicted in FIG. 1E, the water purification device further includes a second discharge conduit 108 having a second inlet 108a and a second outlet 108b, wherein water is transported from the second chamber 104 via the second inlet 108a and exits out of the second chamber 104 via the second outlet 108b. In certain instances, and as depicted in FIG. 1E, the second outlet 108b is positioned above the second inlet 108a with a second distance "L2" such that water inside the second chamber 104 is provided with a second pre-determined amount of dwell time prior to exiting out of the second chamber 104. In operation, and as depicted in FIG. 1E, as long as a top water surface 124 within the second chamber is maintained at or below the lowest point 108c of the second outlet 108b, there is no water discharge from the second chamber 104, to ensure a desirable dwell time of the water.

In certain instances, at least a portion of the first and second discharge conduits 106, 108 each independently have an interior cross-sectional diameter of 0.125 to 0.75 inches, 0.25 to 0.5 inches, 0.25 to 0.375 inches, or 0.375 to 0.5 inches.

In certain instances, the first pre-determined dwell time is optionally controlled and/or adjusted by modulating the incoming flow rate of the raw water. For instances, the raw water may be stored in a raw water reservoir having a raw water outlet with a flow rate control. In this design, an end user may adjust the flow rate control to have a desirable volume of raw water introduced into the first chamber 102, such that the requisite dwell time is ensured with regard to the desirable volume of raw water.

Within the spirit of the water purification device being employed for "point of use" and being of relatively light weight for portable use, an interior treatment volume "V1" and "V2" of the first and second chambers 102, 104 may independently be of any suitable values. In certain instances, the first interior treatment volume V1 generally represents the loading volume of the first plurality of porous ceramic particles 114 or inorganic non-ceramic-particles 116; the second interior treatment volume V2 generally represents the loading volume of the second plurality of porous ceramic particles 114 or inorganic non-ceramic-particles 116. The first and second treatment volumes "V1" and "V2" are each independently of 1,500 to 4,500 cubic inches, 2,000 to 4,000 cubic inches, 2,500 to 3,500 cubic inches, 1,500 to 2,000 cubic inches, 2,000 to 2,500 cubic inches, 2,500 to 3,000 cubic inches, 3,000 to 3,500 cubic inches, 3,500 to 4,000 cubic inches, or 4,000 to 4,500 cubic inches.

Within the spirit of the water purification device being employed for "point of use" and being of relatively light weight for portable use, a height "L" of the water purification device 100, along with "L1" and "L2" as described herein, may have any suitable values. In certain instances, the device height "L" is of from 17 to 36 inches, 18 to 32 inches, 19 to 28 inches, 20 to 24 inches, or 21 to 23 inches. The first conduit discharge height "L1" is of from 10 to 30 inches, 11 to 27 inches, 12 to 24 inches, 13 to 21 inches, or 14 to 18 inches. The second conduit discharge height "L2" is of from 8 to 27 inches, 9 to 23 inches, 10 to 19 inches, 11 to 16 inches, or 12 to 14 inches.

In one or more embodiments, the first and second pluralities of inorganic non-ceramic particles 116 may each independently include one or more types of porous particles such as smectite clay, perlite, sand, vermiculite, zeolite, Fuller's earth, diatomatious earth, shale, and combinations thereof. Suitable porous ceramic particles 114 include those commercially available as Profile Porous Ceramic particles 114 by Profile Products, LLC of Buffalo Grove, Ill. These porous ceramic particles 114 are clay-based montmorillonite particles, optionally mined from Blue Mountain, Missouri (MS), and fired to high temperatures such as 1000° F. to make a porous ceramic particle 114. In one embodiment, the porous ceramic particles 114 are constituted of the following elements, 42% illite±15% by dry weight, 39% quartz±15% by dry weight, and 19% opal±15% by dry weight as determined by X-ray diffraction.

The porous ceramic particles 114 have a size range of at least 95 percent of the porous ceramic particles 114 will pass through about 12,700 micron screen and at least 95 percent will not pass thru about 51 micron screen. Moreover in another embodiment the porous ceramic particles 114 have a size range of at least 95 percent of the porous ceramic particles 114 will pass through about 10,000 micron screen and at least 95 percent will not pass thru about 150 micron screen, the porous ceramic particles 114 have a size range of at least 95 percent of the porous ceramic particles 114 will pass through about 7,500 micron screen and at least 95 percent will not pass thru about 200 micron screen, the porous ceramic particles 114 have a size range of at least 95 percent of the porous ceramic particles 114 will pass through about 4,000 micron screen and at least 95 percent will not pass thru about 51 micron screen, and the porous ceramic particles 114 have a size range of at least 95 percent of the porous ceramic particles 114 will pass through about 2,000 micron screen and at least 95 percent will not pass thru about 51 micron screen. In yet another embodiment, the porous ceramic particles 114 have a size range of at least 95 percent of the porous ceramic particles 114 will pass through about 20,000 micron screen and at least 95 percent will not pass thru about 20 micron screen, the porous ceramic particles 114 have a size range of at least 95 percent of the porous ceramic particles 114 will pass through about 15,000 micron screen and at least 95 percent will not pass thru about 20 micron screen, the porous ceramic particles 114 have a size range of at least 95 percent of the porous ceramic particles 114 will pass through about 10,000 micron screen and at least 95 percent will not pass thru about 20 micron screen, the porous ceramic particles 114 have a size range of at least 95 percent of the porous ceramic particles 114 will pass through about 5,000 micron screen and at least 95 percent will not pass thru about 20 micron screen, the porous ceramic particles 114 have a size range of at least 95 percent of the porous ceramic particles 114 will pass through about 2,000 micron screen and at least 95 percent will not pass thru about 20 micron screen, the porous ceramic particles 114 have a size range of at least 95 percent of the porous ceramic particles 114 will pass through about 20,000 micron screen and at least 95 percent will not pass thru about 75 micron screen, and the porous ceramic particles 114 have a size range of at least 95 percent of the porous ceramic particles 114 will pass through about 20,000 micron screen and at least 95 percent will not pass thru about 150 micron screen.

In certain instances, the porous ceramic particles 114 pass no less than 95 percent on a number #5 sieve and retain no less than 95 percent on a number #30 sieve. These particles are alternatively termed "5×30" particles. In certain other instances, the porous ceramic particles 114 pass no less than 95 percent on a number #24 sieve and retain no less than 95 percent on a number #48 sieve. These particles are alternatively termed "24×48" particles. In yet other instances, the porous ceramic particles 114 pass no less than 95 percent on a number #10 sieve and retain no less than 95 percent on a number #20 sieve. These particles are alternatively termed "10×20" particles. In yet other instances, the porous ceramic particles 114 pass no less than 95 percent on a number ½" sieve and retain no less than 95 percent on a number #6 sieve. These particles are alternatively termed "½"×6" particles.

Non-limiting examples for the 5×30, 10×20, 24×48, and ½"×6 porous ceramic particles 114 include porous ceramic particles 114 under the trade name of "MVP", "Field and Fairway", "Greens Grade", and "Orchid Mix", respectively, available from Profile Products, LLC of Buffalo Grove, Ill. Non-limiting particle distribution values for these particles are tabulated in Tables 1A and 1B below.

TABLE 1A

| | Percentages of particles collected on sieves in millimeters (mm) | | | | | |
|---|---|---|---|---|---|---|
| | 2 mm | 1 mm | 0.5 mm | 0.25 mm | 0.15 mm | 0.05 mm |
| MVP 5 × 30 | 55-63 | 35-43 | 1.5-2.5 | 0.1-0.5 | 0.05-0.2 | 0.05-0.2 |
| Pro League | 18-24 | 67-73 | 5.0-7.0 | 0.2-0.6 | 0.1-0.3 | 0.05-0.2 |
| Field & Fairway 10 × 20 | less than 0.5 | 32-38 | 41-47 | 17-23 | 0.05-0.2 | 0.05-0.2 |
| Greens Grade 24 × 48 | less than 0.5 | 0.05-0.2 | 52-67 | 37-44 | 0.05-0.4 | 0.05-0.4 |
| Quick Dry 60 × 635 | less than 0.05 | less than 0.05 | 1-3 | 17-23 | 30-40 | 30-40 |

It also noted that Quick Dry 60×635 has less than 0.05% of the particles collected on a 0.02 mm sieve.

TABLE 1B

| | Percentages of particles collected on sieves in millimeters (mm) | | | | | |
|---|---|---|---|---|---|---|
| | 9.5 mm | 8.0 mm | 6.3 mm | 3.4 mm | 1.7 mm | <1.7 mm |
| Orchid Mix ½" × 6 | 5-20 | 12-27 | 25-33 | 25-45 | 0.5-3 | 2-7 |

Average pore size of the porous particles, including porous ceramic particles 114 and inorganic non-ceramic particles 116 can be of any suitable values. In certain instances, average pore size range from about 0.1 to about 20 microns, about 0.5 to about 18 microns, about 1.0 to about 16 microns, about 2.0 to about 14 microns, about 2.5 to about 12 microns, about 3.0 to about 10 microns, about 3.5 to about 8 microns, about 0.5 to about 2.5 microns, about 2.5 to about 5.0 microns, about 5.0 to about 7.5 microns, about 7.5 to about 10.0 microns, about 10.0 to about 12.5 microns, about 12.5 to about 15.0 microns, about 15.0 to about 17.5 microns, or about 17.5 to about 20.0 microns in diameter.

In certain instances, the porous ceramic particles 114 are provided with an average surface area as indicated in Table 2 below, in comparison to several types of sand.

TABLE 2

| Particle Type | Diameter (millimeters) | Estimated Average Surface Area (square meters per gram of dry weight) |
|---|---|---|
| Coarse Sand | 1.0 to 0.5 | 20 |
| Profile Porous Ceramic (PPC) Particles | 1.0 to 0.25 | >1,000 |
| Medium Sand | 0.5 to 0.25 | 50 |
| Fine Sand | 0.25 to 0.05 | 100 |
| Very Fine Sand | 0.10 to 0.05 | 250 |

Increasing the surface area of the porous ceramic particles 114 and/or the inorganic non-ceramic particles 116 helps with entrapping the microorganisms and also increasing the number of potential cation exchange sites. In certain other instances, the porous ceramic particles 114 have an average surface area greater than about 1,000 square meters per gram of dry weight. In yet another embodiment, the porous ceramic particles 114 have an average surface area greater than about 100, about 250, or about 500 square meters per gram of dry weight. Even further in another embodiment, the porous ceramic particles 114 have an average surface area about 150 to about 2,500 square meters per gram of dry weight, about 25 to about 500 square meters per gram of dry weight, about 25 to about 350 square meters per gram of dry weight, about 25 to about 250 square meters per gram of dry weight, about 25 to about 150 square meters per gram of dry weight, and about 25 to about 75 square meters per gram of dry weight. In yet another embodiment, the porous ceramic particles 114 have an average surface area of about 500 to about 900 square meters per gram of dry weight, about 500 to about 800 square meters per gram of dry weight, and about 500 to about 700 square meters per gram of dry weight. Even further in another embodiment, the porous ceramic particles 114 have an average surface area about 1,000 to about 10,000 square meters per gram of dry weight.

The cation exchange capacity (CEC) is the number of positive charges that an inorganic particle (inorganic non-ceramic particles and porous ceramic particles) can contain. It is usually described as the amount of equivalents necessary to fill the inorganic particle capacity. (CEC) is the maximum quantity of total cations that a particle is capable of holding, at a given pH value, available for exchange with the media solution. CEC is used as a measure of the potential to deliver cations to deactivate microorganisms and the capacity to purify waste water from pathogenic microorganism contamination. It is expressed as milli-equivalent of hydrogen per 100 g of dry particles (meq/100 g). Thus, higher the CEC value of the inorganic particle, the higher potential capacity of the water purification device to effectively reduce the log amount of pathogenic microorganisms in the waste water. In certain other instances, the porous ceramic particles and/or inorganic non-ceramic particles have a cation exchange capacity (CEC) range of about 1 to about 200 milli-equivalent per 100 g (meq/100 g), about 2 to about 100 meq/100 g, about 5 to about 50 meq/100 g, about 10 to about 30 meq/100 g, about 15 to about 25 meq/100 g, about 5 to about 75 meq/100 g, about 40 to about 125 meq/100 g, about 60 to about 150 meq/100 g, about 100 to about 300 meq/100 g, or any combinations thereof.

Related to the CEC is the measure of voltage across the media composition (biocide, inorganic non-ceramic particles the porous ceramic particles, toxic metal absorber, and/or pH modifier), and the measure of voltage within the purification device or a particular chamber and/or filtration stage. Filling the water purification device with water charges the inorganic particles having a CEC. In at least one embodiment, the charging component is the biocide which contributes cations to associate with the inorganic non-ceramic particles and/or the porous ceramic particles. In at least one embodiment, the efficacy of the water purification device to effectively reduce the amount of pathogenic microorganisms is related to the overall voltage across the waste water within the device. A more consistent and comparable measurement is the voltage as determined in the water of the water filled purification device, not the measured voltage immediately proximate to charging component which may supply the cations. For example, voltage reading within the charging component may result in a voltage measurement that is several fold, or even 10-50 fold higher than the average voltage measurement of the water within the water filled purification device. In one embodiment, the measured voltage across the waste water has an average charge of about 1 to about 2,000 millivolts. In another embodiment, the measured voltage across the waste water has an average charge of about 200 to about 2,000 millivolts, about 1 to about 500 millivolts, about 1 to about 400 millivolts, about 1 to about 300 millivolts, about 1 to about 200 millivolts, about 1 to about 100 millivolts, about 1 to about 50 millivolts, about 20 to about 500 millivolts, about 40 to about 400 millivolts, about 40 to about 300 millivolts, about 40 to about 200 millivolts, and about 40 to about 100 millivolts. In at least one embodiment, the higher the millivolts measured across the waste water, the higher capacity of the inorganic non-ceramic particles and/or the porous ceramic particles to deactivate pathogenic microorganisms. In yet in another embodiment, the higher the millivolts measured across the waste water, the faster the dwell time the waste water flows through the waste water purification device, while still maintaining an effective log reduction of pathogenic microorganisms from the waste water.

In certain other instances, the porous ceramic particles 114 have a total porosity of about 50 to about 90% or about 70 to about 85%, with a total capillary porosity of about 30 to about 50% or about 37 to about 45%, and a total non-capillary porosity of about 25 to about 50% or about 30 to about 40%. In certain other instances, the porous ceramic particles 114 have a total capillary porosity and a total non-capillary porosity in a ratio ranging from about 0.7 to about 1.3. In one embodiment, the ratio of total capillary porosity to capillary porosity is about 1:1. In another embodiment, the ratio of total capillary porosity to capillary porosity is about 0.9:1.1, about 0.8:1.2, about 0.7:1.3, about 1.3:0.7, about 0.8:1.2, and about 0.9:1.1.

In certain other instances, the plurality of inorganic-non-ceramic particles 116 has a total percent porosity range about 33% to about 53%, about 33% to about 40%, about 40% to about 53%, and 47% to about 53%. The plurality of inorganic non-ceramic-particles 116 has a total percent non-capillary porosity range about 20% to about 40%, about 20% to about 30%, 30% to about 40%, about 25% to about 35%, about 35% to about 40%. The plurality of inorganic-non-ceramic-particles 116 and a total percent capillary porosity range about 1.2% to about 22%, about 3% to about 22%, about 5% to about 22%, about 10% to about 22%, about 15% to about 22%, and about 10% to about 22%.

In certain other instances, the porous ceramic particles 114 have a density range of about 0.3 to about 2.0 grams of dry weight per cubic centimeter. In another embodiment, the porous ceramic particles have a density of about 0.45 to about 0.75 grams of dry weight per cubic centimeter, about 0.55 to about 0.65 grams of dry weight per cubic centimeter, about 0.3 to about 0.9 grams of dry weight per cubic centimeter, about 0.5 to about 1.5 grams of dry weight per cubic centimeter, about 1.0 to about 2.0 grams of dry weight per cubic centimeter, and about 1.25 to about 2.0 grams of dry weight per cubic centimeter.

Figure 13:
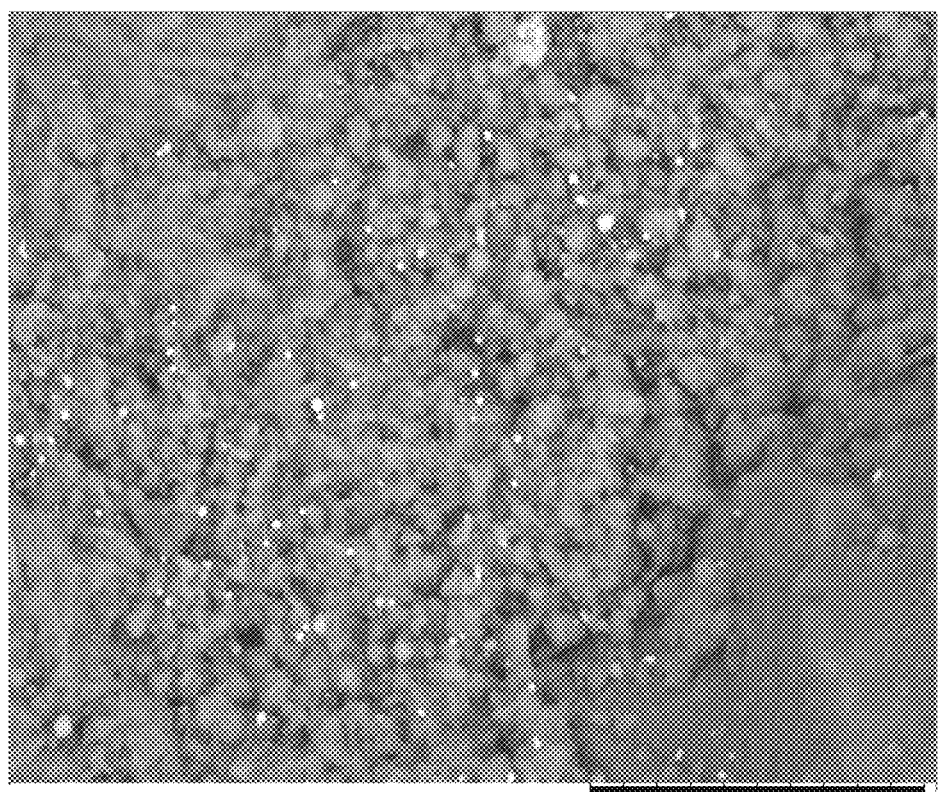
FIG. 13 depicts scanning electron micrograph image showing the porous ceramic particle having surface exchange sites.

Referring back to the cation exchange capacity of the particles, and without wanting to be limited to any particular theory, it is believed that the metals oxidize and exchange cations of silver, copper and zinc with the water on the cation exchange sites within the porous ceramic particles 114 or the inorganic non-ceramic particles 116. This so called "Cation web Matrix Theory" explains why the water purification devices described according to one or more embodiments of the present invention become more effective over time even though the exchange of ions within the water does not change. Referring to FIG. 13, it is believed that about 120 to 150 million particles per device can be charged with metal ions that, when contacted by the microorganisms moving through, exchange with the cell membrane and deactivate the passing through organisms. FIG. 13 depicts scanning electron micrograph of ceramic porous particles 114 at 2,500× magnification where in one embodiment a biocide 128 component, copper, is observed to occupy the crevasses of the porous ceramic particle. In one embodiment, a water filtration device 100 has a filtration stage with porous ceramic particles 114 and another filtration stage having a biocide 128, and the subsequent filling the water purification device 100 with water results in the mixing and transfer of ions from the biocide 128 filtration stage to the porous ceramic particles 114. To expand on this, the microorganisms themselves may contribute to the development of a cation web within the particles. The microorganisms carcasses entrapped within the particles, adsorb the metal cations, which further enhances the microorganism deactivation effectiveness within the water purification device.

Figure 12A:
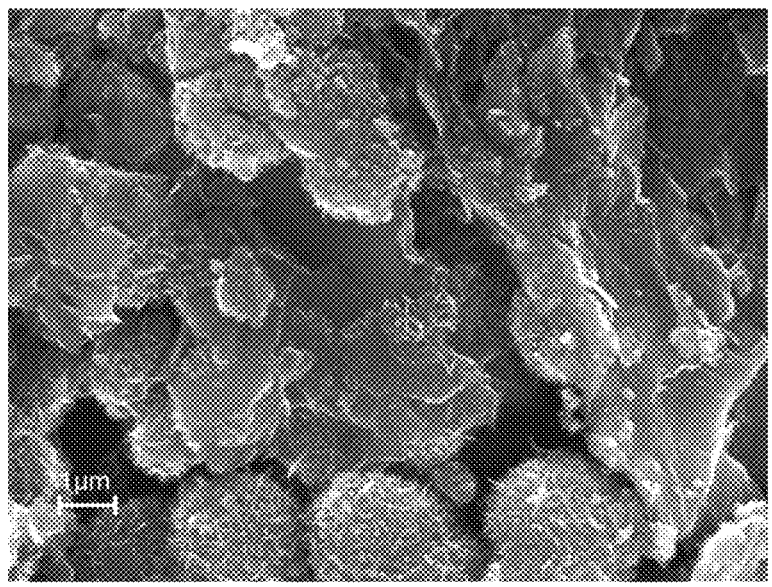
FIGS. 12A and 12B depicts micrograph images showing entrapment of microorganisms by the porous ceramic particles.
Figure 12B:
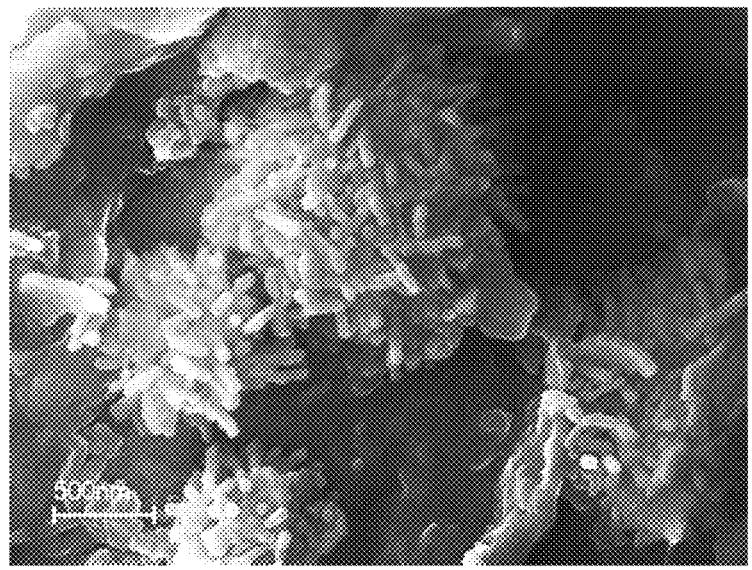

Without wanting to be limited to any particular theory, it is believed that the pores present within the inorganic non-ceramic-particles 116 and/or porous ceramic particles 114 help damage the pathogens. For instance, as gravity carries water through the water purification device 100, pathogens are forced into the pore space, get entrapped therein, where the pathogens may be starved for oxygen and nutrition, contacted by metal cations and become deactivated. FIGS. 12A and 12B are micrograph images showing entrapment of bacteria within the pores by and/or within the porous ceramic particles 114.

In yet another embodiment, and as depicted in FIG. 1E, the water purification device 100 further includes a diffuser 126 for diffusing raw water prior to its entry onto the porous ceramic particles 114 or inorganic non-ceramic-particles 116. The diffuser 126 is optionally spaced apart from the first plurality of porous ceramic particles 114 or inorganic non-ceramic-particles 116. Without wanting to be limited to any particular theory, it is believed that the diffuser 118 functions to reduce raw water inflow energy and help reduce flow disturbance at or near the surface layers of the porous ceramic particles 114 or inorganic non-ceramic-particles 116. The diffuser 126 is optionally a mesh or a screen and can be of any suitable material. Non-limiting examples of the material for the diffuser 126 include metal, metal alloy, plastic, polymer, natural or synthetic polymer, or combinations thereof. In certain instances, the water purification device 100 may further include a filter such as a fine filtration screen and/or a filter cloth to be incorporated within the diffuser, optionally together with a debris strainer, as an extra level of filtration, to provide an enhanced level of performance than simply reducing water inflow energy.

Figure 1F:
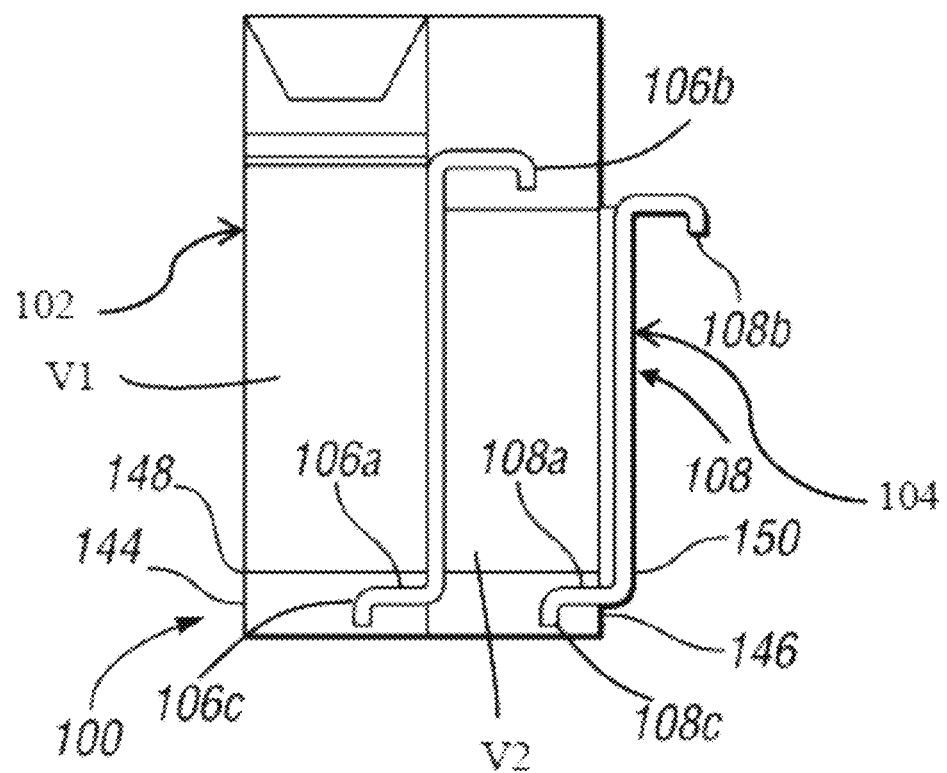

In yet another embodiment, and as depicted in FIG. 1F, the first and second outlets 106b, 108b of the water purification device may each independently be provided a turn portion 106c, 108c, respectively. In certain particular instances, the turn portion 106c, 108c is of an angle of 80 to 100 degrees, or 85 to 95 degrees, relative to the first and second inlets 106a, 108a. Without wanting to be limited to any particular theory, it is believed that turn portions 106c and 108c may help reduce clogging of the first and second inlets 106a, 108a due to debris and waste residues in the vicinity.

In yet another embodiment, and as depicted in FIG. 1F, the first and second chambers 102, 104 may each independently include first and second lower portions 144, 146. In certain instances, the lower portions 144, 146 may contain one or more layers of inorganic non-ceramic-particles 116 and/or porous ceramic particles 114 with relatively larger sizes, such as the "½"×6" or the "Orchid Mix" particles. In certain other instances, the first and second lower portions 144, 146 may be separated from and defined by first and second water-permeable separating layers 148, 150 disposed within the first and second chambers 102, 104, respectively. However, it is appreciated that the water-permeable separating layers 148, 150 are only optional and not necessarily needed. The first and second separating layers 148, 150 may be of any suitable material permeable to water and non-permeable to debris, waste residues, or inorganic non-ceramic-particles and/or porous ceramic particles 114, 116. Non-limiting example of the suitable material for the first and second water-permeable separating layers 148, 150 may include metal, metal alloy, plastic, polymer, natural or synthetic fabrics such as geotextiles and/or related composites. In certain instances, geotextiles are water-permeable fabrics capable of separating, filtering, reinforcing, or draining Without wanting to be limited to any particular theory, it is believed that positioning the first and second inlets 106a, 108a within the first and second lower portions 144, 146, protected by the first and second water-permeable separating layers 148, 150 helps reduce system clogging and help prolong the operable lifetime of the device.

Figure 11A:
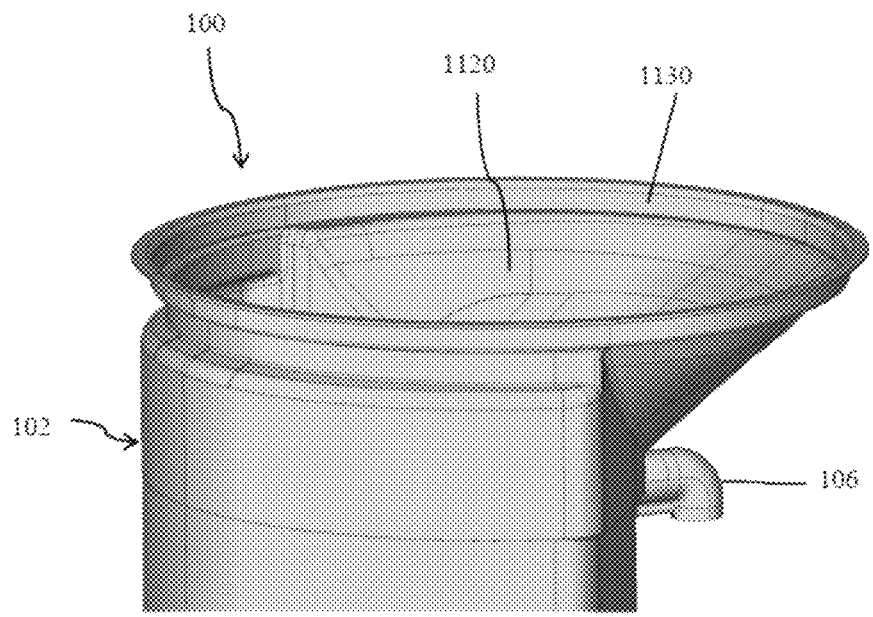
FIG. 11A depicts a side view of another embodiment of a chamber.
Figure 11B:
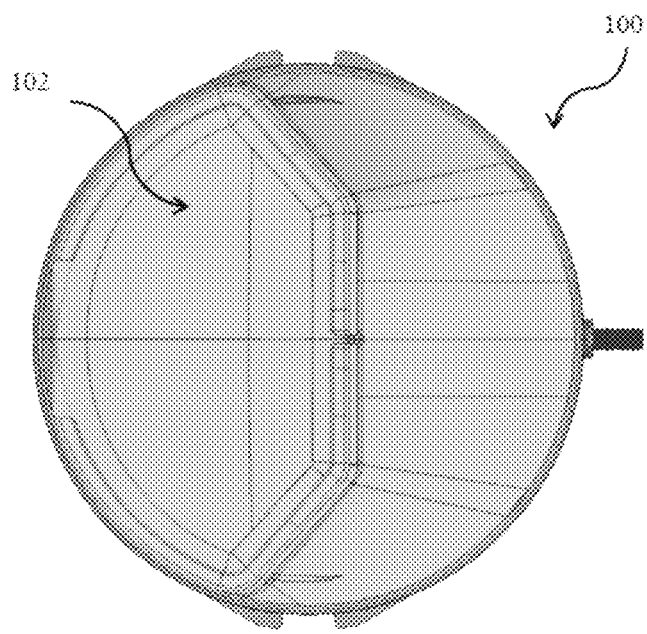
FIG. 11B depicts a top view of FIG. 11A.
Figure 11C:
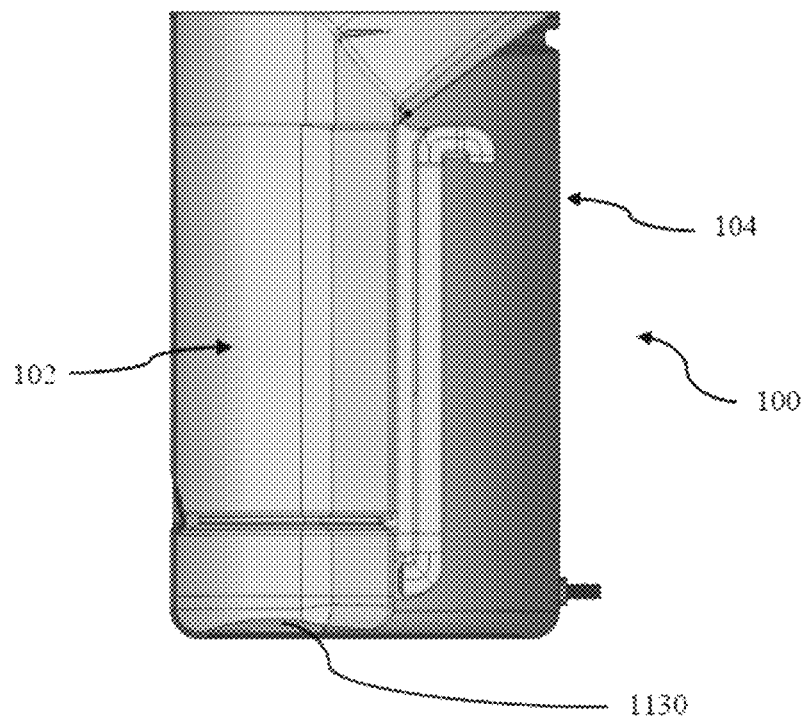
FIG. 11C depicts a side view of another embodiment of a water purification device.
Figure 11D:
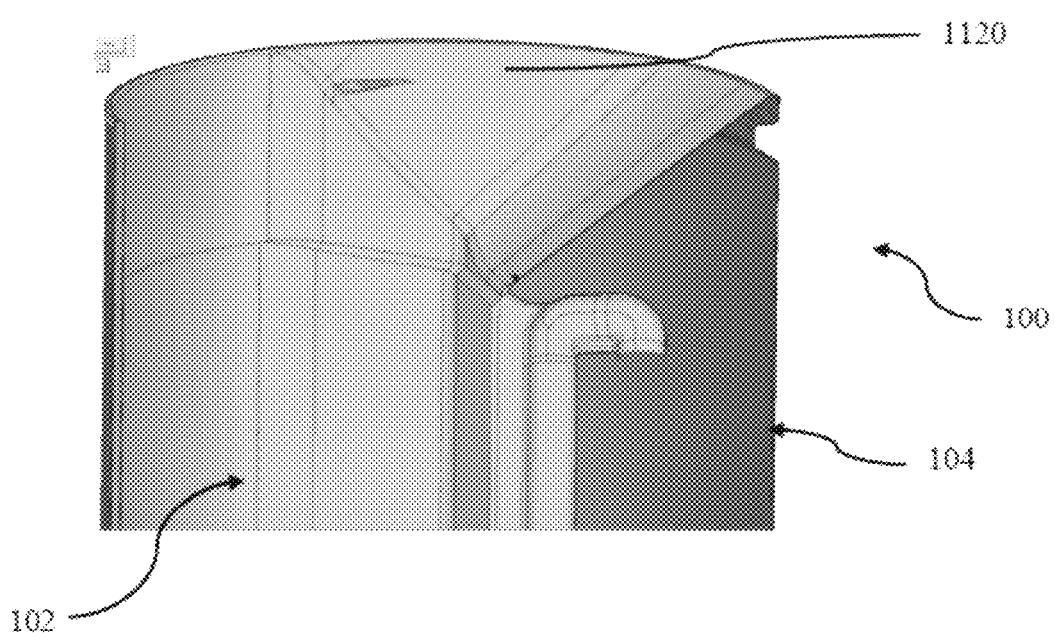
FIG. 11D depicts an enlarged side view of FIG. 11C.
Figure 11E:
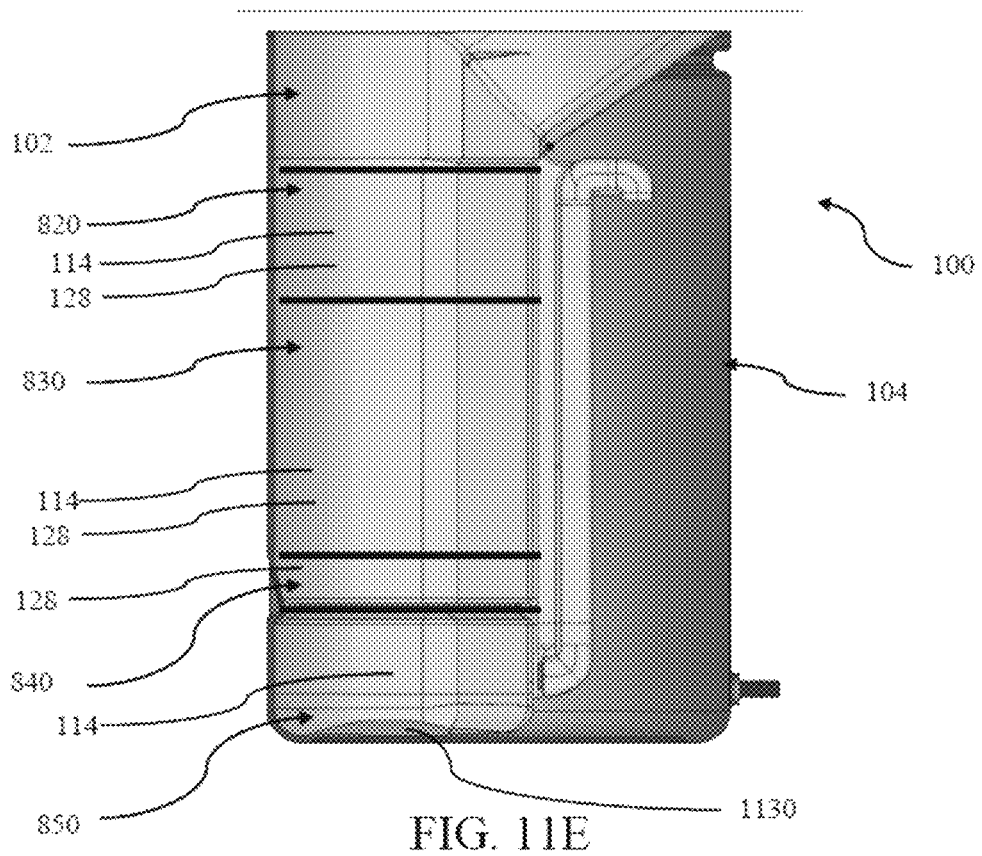
FIG. 11E depicts a side view of another embodiment of a water purification device.

In yet another embodiment referring to FIGS. 11A-11E, chamber 1 102 sits inside chamber 2 104. The top of chamber 1 102 is designed to cover chamber 2 104 once inserted into the unit, this will prevent potential contamination of the safe storage compartment of chamber 2 104. A chamber receiving ring 1110 of chamber 1 102 may form a lip, a seal, and the like to unpurified waste water from entering chamber 2 104 before being purified in chamber 1 102. Referring to FIG. 11A, in one embodiment, the receiving ring 1110 is disposed as a lip portion of the hopper portion 1120 of chamber 1 102. The receiving ring 1110 may be formed of any suitable material to form a seal, such as plastic, rubber, metal, wood, expandable wood, fabric, ceramic, and the like. The hopper portion 1120 of chamber 1 102 is where waste water is initially placed into the water purification device. The hopper portion 1120 acts as a chute in which waste water is directed in the water purification device 100. Thus, referring to FIGS. 11C and 11D, the hopper portion 1120 of chamber 1 102 is larger than chamber 2's 104 upper portion. The hopper portion being larger than the opening of chamber 2 allows chamber 1 to sit within chamber 2, as well as, reduce raw waste water being poured into the device to directly contaminate the safe store container (chamber 2, as shown in FIGS. 11C and 11D). A hopper portion may take on may shapes or sizes including funnel, and downward angled. In another aspect, the hopper may regulate the flow of waste water into the water purification device and, thus, regulate the dwell time of the system through the design and/or shape of the hopper; the hopper shape may help regulate the amount of water head space sits on top of the water filtration device before entering the media.

The biocide 128 supplies ions to charge the porous ceramic particles 114 and/or the inorganic non-ceramic-particles 116 which in at least one embodiment impart increased purification and/or effective microorganism killing characteristics of the water purification device 100. Also, the biocide 128, toxic metal absorber, or both the biocide 128 and toxic metal absorber may be placed within a safe storage container, which houses water that has been purified through the device 100. Thus, in one embodiment, the biocide 128, toxic metal absorber, or both the biocide 128 and toxic metal absorber may be placed in the safe storage container to aid in continuing a sufficient log reduction of pathogenic microorganisms from the water. Likewise in another embodiment, the biocide 128, toxic metal absorber, or both the biocide 128 and toxic metal absorber may be placed in all filtration stages and/or chambers to impart the desired characteristics. In yet another embodiment referring to FIG. 11C, a hidden pocket 1130 under chamber 1 102 allows to secure a biocide, toxic metal absorber, or both a biocide and toxic metal absorber filled "sock", "sack", or "water-permeable detachable sack" for added performance and residual disinfection. The filled water-permeable detachable sack may be positioned within chamber 1 102 or chamber 2 104, or both chambers or in any chamber of the water purification device 100 if the device has more than two chambers. The filled water-permeable detachable sack may be re-charged with new biocide 128, toxic metal absorber, or both a biocide 128 and toxic metal absorber to maintain the desired purification and killing characteristics of the water purification device 100. Those in the art understand that the purification and killing characteristics of the biocide 128, toxic metal absorber, or both a biocide 128 and toxic metal absorber filled sock may not need a sock; rather, the biocide 128, toxic metal absorber, or both a biocide 128 and toxic metal absorber may be pressed into a bar or any other shape and deposited into at least one chamber of the device. Likewise, the biocide 128, toxic metal absorber, or both a biocide 128 and toxic metal absorber may be placed as lose particles within at least one chamber of the device 100.

Figure 1G:
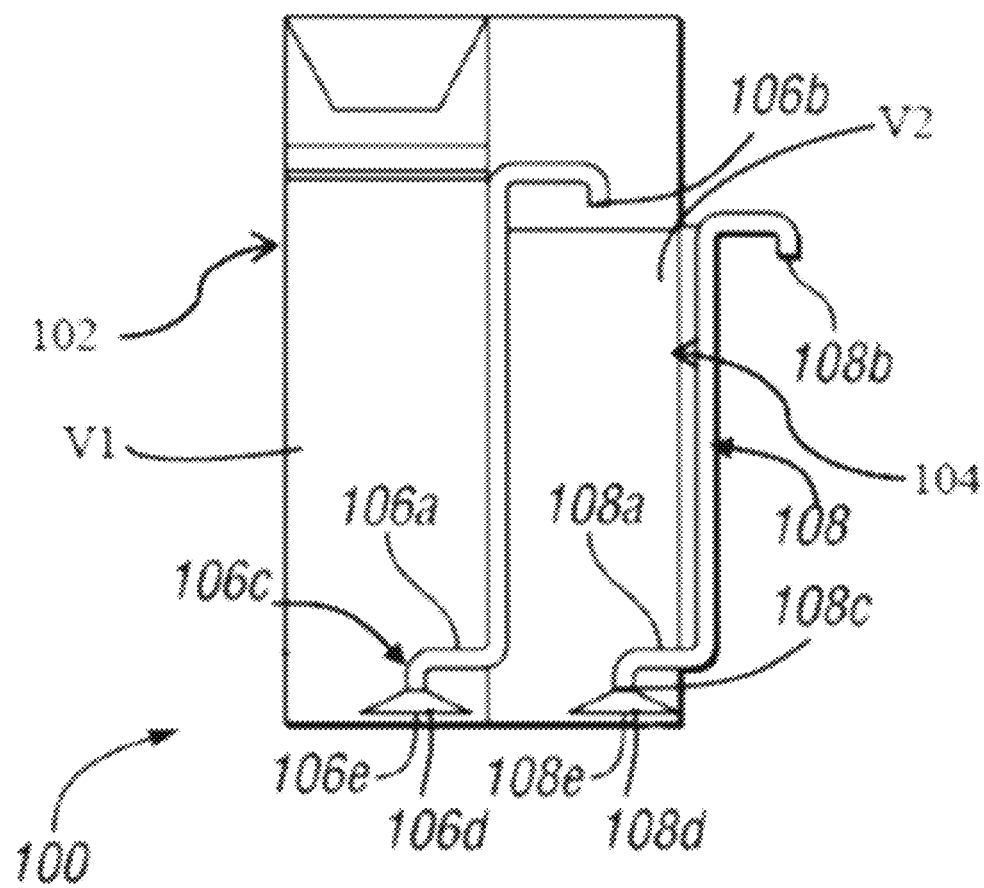

In yet another embodiment, and as depicted in FIG. 1G, the first and second outlets 106b, 108b may have an enlarged end portion 106d, 108d each covered with a filter layer 106e, 108e of materials and performing functions similar to the separating layers 148, 150.

Figure 1H:
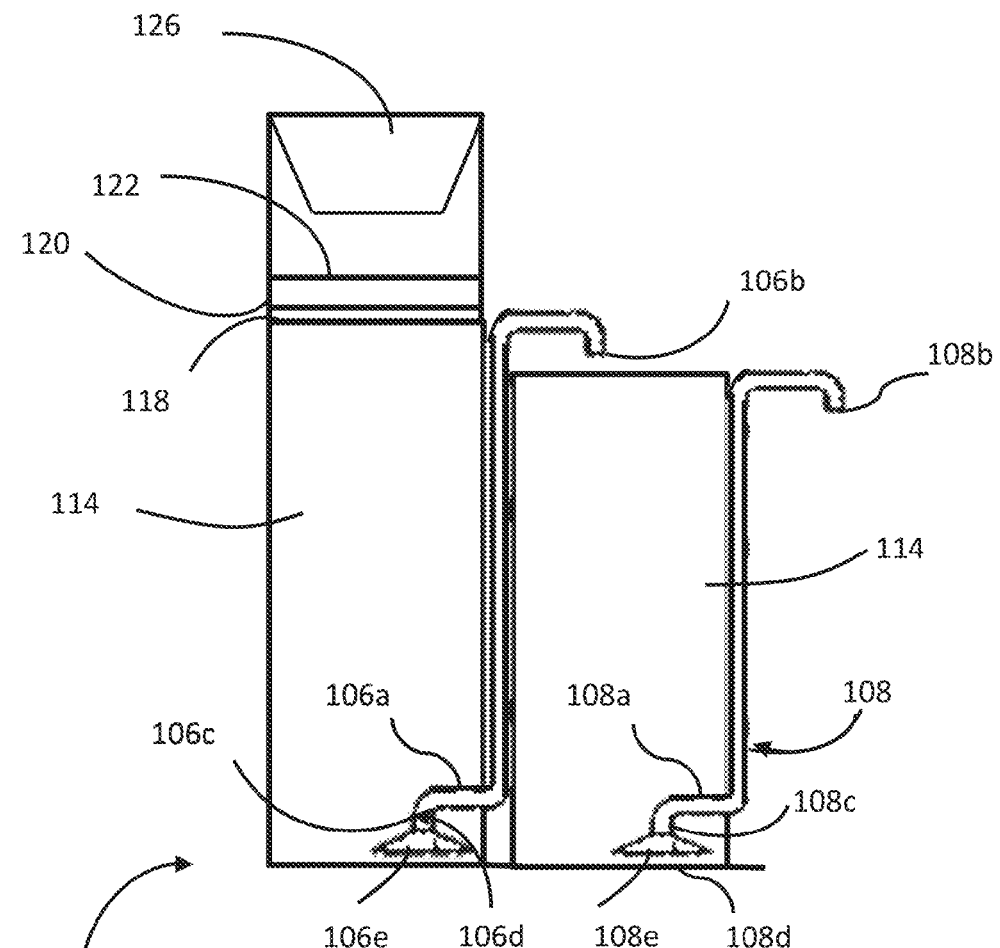
Figure 1I:
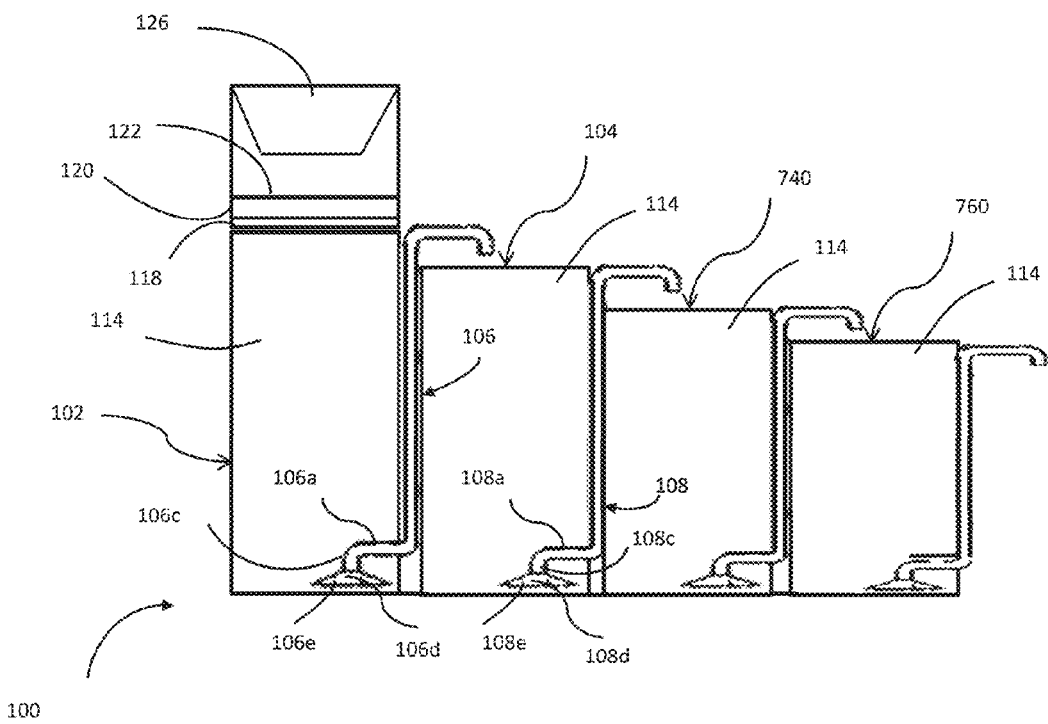
Figure 1J:
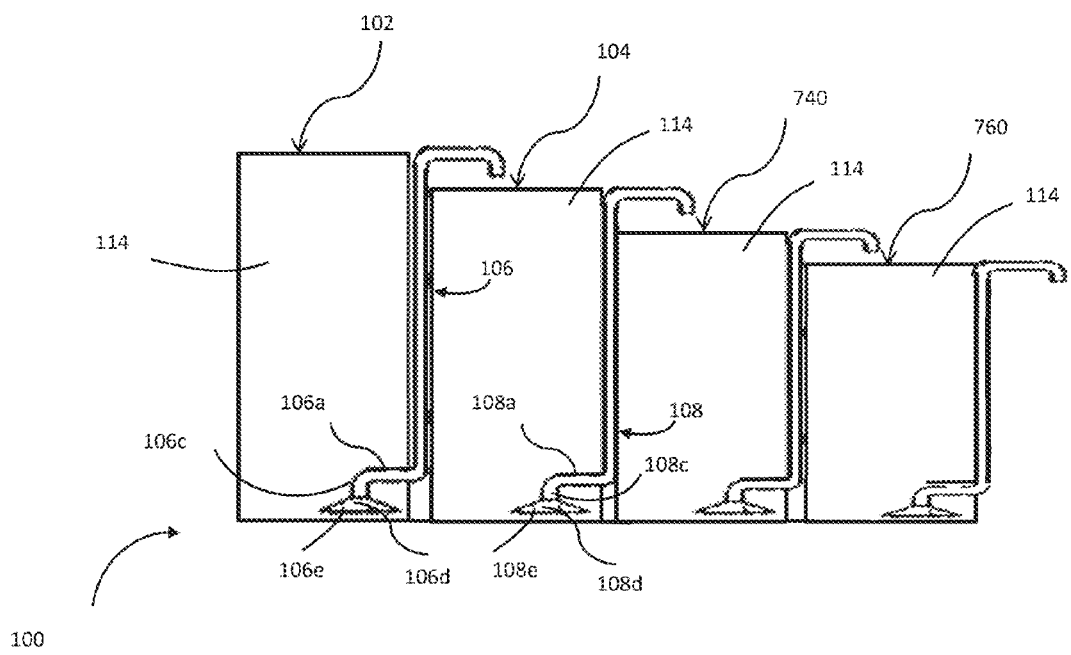

In yet another embodiment, and as depicted in FIG. 1H, first and second top portions 152, 156 of the first chamber 102 and first and second bottom portions 154, 158 of the second chamber 104 each independently include a plurality of porous ceramic particles 114 or inorganic non-ceramic-particles 116 having an average particle size greater than the average particle size of the first and second pluralities of porous ceramic particles 114 or inorganic non-ceramic-particles 116. This design may help provide greater sediment entrapment and easier device maintenance. In this design, the top and bottom portions 152, 156, 154, 158 may each independently include more than one variety of porous ceramic particles 114 or inorganic non-ceramic-particles 116 as long as an average particle size thereof is greater than the average particle size of the porous ceramic particles 114 or inorganic non-ceramic-particles 116 in the bulk of the chambers 102, 104. For instance, the top and bottom portions 152, 156, 154, 158 may each independently include porous ceramic particles 5×30 and 10×20 while the bulk includes porous ceramic particles 24×48.

Figure 2:
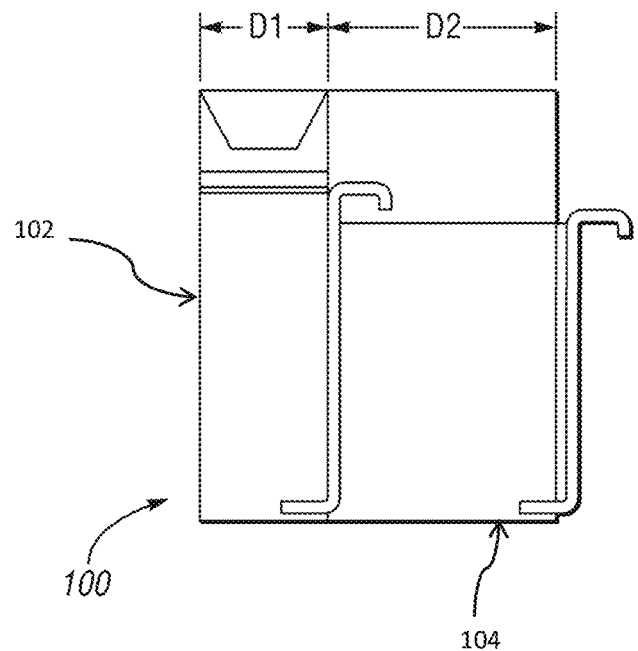
FIG. 2 depicts a cross-sectional view of a variation to a water purification device.

In yet another embodiment, and as depicted in FIG. 1I and FIG. 2, the water filtration device 100 has a plurality of chambers 102 and 104 arranged in a serial relationship. As depicted in FIG. 2, the first chamber 102 and the second chamber 104 are arranged in a horizontal serial relationship. As depicted in FIG. 1I, four chambers are depicted in a horizontal serial relationship wherein each chamber contains porous ceramic particles and/or inorganic non-ceramic particles 114 and 116. However, it is to be understood that one or more chambers may be devoid porous ceramic particles and/or inorganic non-ceramic particles. For example, the fourth chamber 104 may serve as a purified water retention reservoir after the waste water has been purified through the previous chambers. Further, referring to FIGS. 5A and 5B, the serial relationship of the chambers 102 and 104 may be in a "stacked" or in "vertical" relationship.

In yet another embodiment, the particle composition of each chamber 102 or 104 may be of similar composition or have different particles of different sizes and shapes. Referring to FIGS. 5C, 5D, 5F, 5G, and 5H, each chamber 102 and 104 may have a different composition of porous ceramic particles 114 or inorganic non-ceramic-particles 116 as shown by different shading of the chambers. For example, FIG. 5C depicts five chambers in a stacked-serial relationship, wherein each chamber 102 and 104 is composed of different types of porous ceramic particles 114 and/or inorganic non-ceramic particles 116. Yet in another embodiment, referring to FIG. 5D, a four chambers are arranged in a stacked, serial relationship, wherein a duplicity of porous ceramic particles 114 and/or inorganic non-ceramic-particles 116 is found in the first chamber 102 and third chamber 740 from the top as well as the second and fourth chamber 760 from the top.

In yet another embodiment, the number of chambers arranged in a serial relationship is between about 2 to about 30. Even further in another embodiment, the number of chamber arranged in a serial relationship is between about 2 to about 5, about 3 to about 6, about 2 to about 10, about 2 to about 20, about 15 to about 30, and about 10 to about 20.

In a variation, the top and bottom portions 152, 156, 154, 158 may each independently include a particle supporting matrix to reduce the mobility of relatively larger porous ceramic particles 114 or inorganic non-ceramic-particles 116 and to further improve entrapment of debris and waste organism. Non-limiting examples of the particle supporting matrix include synthetic and/or non-synthetic fiber mesh. Particularly useful examples of the fiber mesh structures may include those used as turf control mats (TCM) derived from nylon or polymer fibers as an interconnected matrix. Some particular examples of the TCM structures useful for this design include three dimensional mats under the trade name of "Enkamat" marketed by Colbond USA, headquartered in the Netherlands.

In one or more embodiments, the inorganic non-ceramic-particles 116 and/or porous ceramic particles 114 may be of any suitable shapes. Dependent upon particular water-drinking needs, the inorganic non-ceramic-particles 116 and/or porous ceramic particles 114 may be designed and constructed in one or more shapes including gravel, granules, grains, flakes, rods, powders, cylinders, pyramids, cubes, and combinations thereof, and in various dimensions thereof.

As can be seen from the non-limiting design of the water purification device 100 depicted in FIGS. 1A-1E, water flow within the first and second chambers 102, 104, and water flow from the first chamber 102 to the second chamber 104 may each be independently driven by gravity. Therefore, the water purification device 100 can be utilized in certain areas of the developing world where external energies such as electrical energies are limited in source and/or by economic concerns.

In yet another embodiment, the first and second chambers 102, 104 may each independently include a biocide 128. In certain instances, the first and second chambers 102, 104 both include a biocide 128. To balance between filtration efficacy and material and implementation costs, and in certain instances, the biocide 128 may only be included in second chamber 104 and not in the first chamber 102. The biocide 128 may be disposed in any suitable portions of the second chamber 104. In certain instances, and as depicted in FIG. 1E, the biocide 128 is intermixed with the second plurality of inorganic non-ceramic-particles 116 and/or porous ceramic particles 114. In certain instances, the biocide 128 includes an agent selected from the group consisting of copper-containing biocide, silver-containing biocide, a zinc-containing biocide, a halogen-containing biocide, a cation detergent, an organic acid, and combinations thereof. In certain instances, the biocide 128 includes at least one component selected from the group consisting of zinc, ground zinc, zinc alloys, zinc chloride, zinc oxide, silver, ground silver, silver alloys, colloidal silver, silver nitrate, silver dehydrate, copper, ground copper, copper alloys, copper sulfate, brass, iodine, a cation detergent, benzalkonium chloride, cetylpyridinium chloride, sorbic acid, benzoic acid, organic acid, bromine, nickel, aluminum, halogen and combinations thereof. In certain instances, the biocide 128 includes one or more of zinc, copper and silver. In certain particular instances, and when employed, silver and copper as present in the biocide 128 have a silver/copper weight ratio of 0.001 to 0.020 or 0.005 to 0.015. In certain other particular instances, and when employed, zinc to copper as present in the biocide have a zinc/copper weight ratio of about 0.05 to about 0.20 or about 0.10 to about 0.15.

In certain other particular instances, and when employed, silver and zinc as present in the biocide have a silver/zinc weight ratio of about 0.025 to about 0.015 or about 0.05 to about 0.01. In yet in another embodiment, the biocide 128 includes silver and copper, wherein a ratio of silver to copper is about 1:10 to about 1:150. In a further embodiment, the ratio of silver to copper is about 1:20, about 1:50, about 1:75, about 1:100, or about 1:125. In yet in another embodiment, the biocide 128 includes copper and zinc, wherein a ratio of copper to zinc is about 0.1:1 to about 10:1. In a further embodiment, the ratio of copper to zinc is about 0.2:1, about 0.3:1, about 0.4:1, about 0.5:1, or about 0.8:1. Still further in another embodiment, the ratio of copper to zinc is about 9:1, about 7:1, about 5:1, about 3:1, or about 2:1. In yet in another embodiment, the biocide 128 includes silver and zinc, wherein a ratio of silver to zinc is about 1:10 to about 1:100. Still further in another embodiment, the ratio of silver to zinc is about 1:20, about 1:40, about 1:60, and about 1:80. In yet in another embodiment, the biocide 128 includes zinc and copper sulfate, wherein a ratio of zinc to copper sulfate is about 1:1 to about 30:1. Still further in another embodiment, the ratio of zinc and copper sulfate is about 2:1, about 5:1, about 10:1, about 20:1 and about 25:1. In these embodiments, the terms "silver", "copper", and "zinc" are not exclusive. The term "silver" may collectively refer to and include, but not limited to silver, ground silver, silver alloys, colloidal silver, silver nitrate, and silver dehydrate. The term "copper" may collectively refer to and include, but not limited to copper, ground copper, copper alloys, and copper sulfate. The term "zinc" may collectively refer to and include, but not limited to ground zinc, pure zinc, zinc alloys, zinc chloride, and zinc oxide.

In yet in another embodiment, Cu may have a volume range of about 0.5 to about 8 cubic inches, about 0.5 to about 6 cubic inches, about 0.5 to about 4 cubic inches, about 0.5 to about 2 cubic inches, about 1 to about 8 cubic inches, about 3 to about 8 cubic inches, about 5 to about 8 cubic inches, and about 6 to about 8 cubic inches. In yet in another embodiment, Ag may have a volume range of about 0.01 to about 1 cubic inches, about 0.01 to about 0.05 cubic inches, about 0.01 to about 0.03 cubic inches, about 0.05 to about 1 cubic inches, and about 0.07 to about 1 cubic inches. In yet in another embodiment, Cu-sulfate may have a volume range of about 0.01 to about 1 cubic inches, about 0.01 to about 0.75 cubic inches, about 0.01 to about 0.5 cubic inches, about 0.05 to about 1 cubic inches, and about 0.1 to about 1 cubic inches. In yet in another embodiment, Zn alloy may have a volume range of about 0.1 to about 2.5 cubic inches, about 0.5 to about 2.5 cubic inches, about 1 to about 2.5 cubic inches, about 1.5 to about 2.5 cubic inches, about 0.1 to about 1.5 cubic inches, and about 0.1 to about 1 cubic inches. In yet in another embodiment, pure Zinc having a volume range of about 0.01 to about 1.5 cubic inches, about 0.01 to about 1 cubic inches, about 0.01 to about 0.5 cubic inches, about 0.01 to about 0.1 cubic inches, about 0.01 to about 0.1 cubic inches, and about 0.01 to about 0.5 cubic inches.

In certain particular instances, the biocide 128 includes particles of silver, copper, and/or zinc in the shapes of, for instances, rods, needles, flakes, granules, and combinations thereof. In yet other particular instances, at least a portion of the silver, copper, and/or zinc particles each independently pass no less than 95 percent a size #10 sieve and retain no less than 95 percent on a size #200 sieve. In yet other particular instances, at least a portion of the silver, copper, and/or zinc particles each independently pass no less than 95 percent a size #16 sieve and retain no less than 95 percent on a size #150 sieve. In yet other particular instances, at least a portion of the silver, copper, and/or zinc particles each independently pass no less than 95 percent a size #25 sieve and retain no less than 95 percent on a size #100 sieve.

The average size of the porous ceramic particle 114 and/or the inorganic non-ceramic particle 116 to the biocide 128 may help the subsequent equilibration of charged ions across the water purification device 100 after the device is filled with water. In certain instances the biocide 128 average size to porous ceramic particle 114 and/or the inorganic non-ceramic particle 116 average size is in a ratio about 5:1 to about 1:5, about 5:1 to about 1:3, about 5:1 to about 1:2, about 4:1 to about 1:5, about 3:1 to about 1:5, and about 2:1 to about 1:5. The average size may be determined through the average diameter size of the porous ceramic particle 114 and/or the inorganic non-ceramic particle 116 and biocide 128. However, in non-uniform size porous ceramic particle 114 and/or the inorganic non-ceramic particle 116 and biocide 128 that may have non-nearly-circular shapes, the average size may be determined through sifting the porous ceramic particle 114 and/or the inorganic non-ceramic particle 116 and biocide 128 through a mesh screen.

Without wanting to be limited to any particular theory, it is believed that positively charged ions of certain metals such as copper, silver and zinc attract and bond to the negatively charged cell walls of the pathogenic organisms. It is further believed that copper and zinc ions destroy permeability of the pathogenic cell walls; and silver ions enter the pathogenic organisms, interfering with protein enzyme synthesis. In most instances, damage to the cell walls alone may be sufficient to deactivate the pathogenic organisms.

Ionization of metals presented in relatively smaller porous ceramic particle 114 and/or the inorganic non-ceramic particle 116, greater surface area tends to provide higher ionization exchange in the water and greater pathogen reduction. In certain instances, it is believed that biocidal metals including silver, zinc and copper ionize the water to produce positively charged ions, which then attach themselves to the pathogens such as bacterial cell walls, damaging and deactivating the pathogen. When combined with the porous ceramic particle 114 and/or the inorganic non-ceramic particle 116, the positively charged ions may be adsorbed onto the porous ceramic particle 114 and/or the inorganic non-ceramic particle 116, creating a cation web matrix to provide additional synergy in the biocidal effects of the water purification device 100. Moreover, the porous ceramic particle 114 and/or the inorganic non-ceramic particle 116 entrap pathogens, and therefore, negative charges on the pathogens help attract the positively charged biocidal ions onto the porous ceramic particle 114 and/or the inorganic non-ceramic particle 116 upon which positive charged ions are already present. This also improves the synergistic biocidal effects of the water purification device 100.

In one or more embodiments, it is appreciated; however, the sizes of the metals are to be balanced against the desirable water flow, as finer particle sizes are generally related to slower transport of the water flowing through the metal particles. In addition, it is believed that calcium carbonate helps increase the pH value of the water within and exiting the second filtration container. It is also believed that the calcium ions $Ca^{2+}$, via their positive charges, are attachable to porous ceramic particle 114 and/or the inorganic non-ceramic particle 116 such as clay particles which are often negatively charged, hence enhancing clarity and reducing turbidity of the discharge water.

In yet another embodiment, the first and second chambers 102, 104 may each independently include a toxic metal absorber selected from the group consisting of an iron oxide, a manganese oxide, aluminum hydroxide, aluminum oxide, bone meal, iron ore, metal fillings, positively charged and negatively charged resins, granular activated carbon or combinations thereof. When employed, the toxic metal absorber may be contained within a detachable sack for easy access and removal. The sack for holding the toxic metal absorber can be of any suitable material that is water-permeable and does not facilitate any material leakage of the toxic metal absorber from the sack. The toxic metal absorber can be positioned on top of the first and second pluralities of porous ceramic particle 114 and/or the inorganic non-ceramic particle 116 such that water contacts the toxic metal absorber prior to exiting to the first or second plurality of porous ceramic particle 114 and/or the inorganic non-ceramic particle 116. To balance between filtration efficacy and material and implementation costs, and in certain instances, the toxic metal absorber may be included in one or both of the first chamber 102 and the second chamber 104. Without wanting to be limited to any particular theory, it is believed that the toxic metal absorber is beneficial in trapping and hence reducing concentrations in water of arsenide, arsenate, and/or fluoride. In certain instances, the iron oxide is selected from the group consisting of FeO, $Fe_3O_4$, $Fe_2O_3$, $\alpha$-$Fe_2O_3$, $\beta$-$Fe_2O_3$, $\gamma$-$Fe_2O_3$, $\epsilon$-$Fe_2O_3$, $(Fe(OH)_2)$, $(Fe(OH)_3)$, ($\alpha$-FeOOH), ($\beta$-FeOOH), ($\gamma$-FeOOH), ($\delta$-FeOOH), ($Fe_5HO_8 \cdot 4H_2O$), FeOOH, and combinations thereof. In certain other instances, manganese oxide is selected from the group consisting of MnO, $Mn_3O_4$, $Mn_2O_3$, $MnO_2$, $Mn_2O_7$ and combinations thereof. In yet another embodiment the toxic metal absorber has a volume range of about 1,237 to about 6,186 cubic centimeters, 2,000 to about 6,186 cubic centimeters, 3,000 to about 6,186 cubic centimeters, 4,000 to about 6,186 cubic centimeters, 5,000 to about 6,186 cubic centimeters, 2,000 to about 4,000 cubic centimeters, 4,000 to about 10,000 cubic centimeters.

In yet another embodiment, and as depicted in FIGS. 1E, 1H, and 1I, a bio-film zone 118 is disposed on top of the porous ceramic particle 114 and/or the inorganic non-ceramic particle 116. Without being limited to any particular theory, it is believed that beneficial organisms contained within the bio-film help breakdown one or more types of pathogens involved in the raw water. The beneficial organisms may be derived naturally from the raw water or may be added from an external source. In particular instances, the bio-film may include a substrate such as porous ceramic particle 114 and/or the inorganic non-ceramic particle 116 to support the beneficial organisms. In the meantime, the porous ceramic particle 114 and/or the inorganic non-ceramic particle 116 may also be provided with certain level of porosity, synergistically providing the aerobic beneficial organisms with a safe place to live and thrive at the water/particle interface in the bio-remediation chamber.

In certain instances, the bio-film zone 118 has a thickness of up to 3.0 inches. In certain particular instances, the bio-film zone 118 has a thickness of 0.1 to 3.0 inches, 0.1 to 2.5 inches, 0.1 to 2.0 inches, 0.1 to 1.5 inches, 0.1 to 1.0 inches, or 0.1 to 0.5 inches.

In one or more embodiments, raw water is introduced into the top of the first chamber 102 and flows down by gravity through the porous ceramic particle 114 and/or the inorganic non-ceramic particle 116. The raw water first passes through a diffusion plate such as the diffuser 118, which reduces the disruptive force of the input water and large debris, and protects a delicate biological layer. Without wanting to be limited to any particular theory, it is believed that the porous ceramic particle 114 and/or the inorganic non-ceramic particle 116 functions as a physical barrier that traps water-born particles and larger organisms, Protozoa, Helminthes, and cysts causing them to accumulate in the uppermost layers of the porous ceramic particle 114 and/or the inorganic non-ceramic particle 116. Organic material and microorganisms caught in the uppermost layers of the porous ceramic particle 114 and/or the inorganic non-ceramic particle 116 may eventually develop into a dense population referred to as a biological layer such as the bio-film zone 118.

As the water passes through the bio-film zone 118, microbial contaminants such as parasites, bacteria, viruses, and organic contaminants may be consumed by the beneficial organisms residing in the bio-film zone 118. Protozoa, helminthes, and cysts are too large to pass through the first few layers of the porous ceramic particle 114 and/or the inorganic non-ceramic particle 116 and are retained within the bio-film zone 118. As the beneficial organisms require certain moisture to remain viable, sufficient water is provided to the first container 102 such that the bio-film zone 118 is constantly in contact with water at any operational time point. In certain instances, and to ensure sufficient oxygen transfer to maintain the functionality of the beneficial organism, a thin water layer 120 is constantly maintained above the bio-film zone 118 to keep the beneficial organisms moist and alive.

The porous ceramic particle 114 and/or the inorganic non-ceramic particle 116 may act as a microscopic sedimentation bed for the passing water, helping reduce turbidity, odor, taste, and/or entrapping harmful micro-organisms from the water. The size and shape of the porous ceramic particle 114 and/or the inorganic non-ceramic particle 116 may be varied to tailor the formation of the bio-film zone 118 and hence the effectiveness of the filtration process. By the time the water reaches through the bulk of the porous ceramic particle 114 and/or the inorganic non-ceramic particle 116, a significant percentage such as 30 to 60 percent of microbial contaminants have been eliminated by the bio-remediation stage.

In one or more embodiments, the bio-film zone 118, thin water layer 120, and diffuser 126 is optional. As depicted in 1J, the water purification device 100 does not have a bio-film zone 118, thin water layer 120, and diffuser 126. For illustration purposes, FIGS. 5A-5J illustrates a stacked, serial relationship of the chambers. In another embodiment referring to FIGS. 5F and 5G, the stacked-serial chambers may include the bio-film zone 118, thin water layer 120, and diffuser 126. The water purification device does not have to have a bio-film zone 118, thin water layer 120, and diffuser 126 if the chambers are oriented in a stacked-serial relationship.

In one or more embodiments, the water purification device 100 may be portable or stationary. The stationary version of the water purification device 100 may be used for community use, or these devices can be termed community devices. When designed as portable, the water purification device 100 may have a dimension selected from the group consisting of a longitudinal length of between 15 to 36 inches, a total dry weight of 25 to 200 pounds, a cross-section of 10 to 24 inches in diameter, and combinations thereof. In certain instances, the total dry weight may be 30 to 150 pounds, 35 to 125 pounds, 40 to 85 pounds, 45 to 80 pounds, 50 to 75 pounds, 35 to 45 pounds, 45 to 50 pounds, 50 to 55 pounds, 55 to 60 pounds, 60 to 65 pounds, 65 to 70 pounds, 70 to 75 pounds, 75 to 80 pounds, 80 to 85 pounds, or 85 to 90 pounds. When designed as stationary, the water purification device 100 may have a dimension selected from the group consisting of a longitudinal length of between 30 to 110 inches, a total dry weight of 120 to 8000 pounds, a cross-section of 20 to 60 inches in diameter, and combinations thereof. In certain instances, the total dry weight of the stationary type of the water purification device may have a dry total weight of 1,000 to 6,000 pounds, 1,000 to 3,000 pounds, 2,000 to 5,000 pounds, or 2,000 to 6,000 pounds.

The purified water flows out of the second outlet 108b and may be collected in a safe storage container to prevent post-treatment contamination. Average flow rate of the filtration device 100 may be 4 to 10 liters per hour, enough to provide a family of four with sufficient water for their daily drinking and cooking needs. Assuming an individual needs 2 liters of water per day to drink, a family of 5 needs 10 liters. The water purification device 100 can generate 20, 25, 30 liters or more in 5 hours. Fifteen liters is typically needed for cooking and bathing. Therefore, the water generation capacity of the water purification devices according to one or more embodiments of the present invention is well suited for that need. A safe storage container, as used herein, refers to a container/chamber/reservoir that acts to hold waste water that has flowed through and is now purified water. In one or more embodiments, the safe storage container may refer to a second chamber, or a partition within a first chamber which the partition holds purified water. A safe storage container may include a biocide and/or a toxic metal absorber to continue and maintain effective log reduction of pathogenic bacteria and other desirable water characteristics.

In yet another embodiment, and as depicted in FIG. 2, the cross-sectional diameter "D1" of the first chamber 102 is different from, and particularly smaller than, the cross-sectional diameter "D2" of the second chamber 104. Relative to "D2" of FIG. 1E, "D2" of this design is extended and represent a wider biocidal chamber for certain particular projects. In this design, the total dry weight of the water purification device 100 may be 10 to 50 pounds heavier than the water purification device 100 referenced in FIG. 1E.

In certain instances, a volume ratio between the first and second chambers 102, 104 can be 10:1 to 1:10, 8:1 to 1:8, 6:1 to 1:6, 4:1 to 1:4, or 2:1 to 1:2. In certain particular instances, and as depicted in FIG. 1E, the volume ratio between the first and second chambers 102, 104 is 1.5:1 to 1:1.5 or 1.1:1 to 1:1.1. In other particular instances, and as depicted in FIG. 2, the volume ratio between the first and second chambers 102, 104 is 1:1.5 to 1:2.5 or 1:1.8 to 1:2.2. In yet in another embodiment, the water purification device has a volume range of about 19,418 to about 268,436 cubic centimeters, about 19,418 to about 150,000 cubic centimeters, about 19,418 to about 100,000 cubic centimeters, about 19,418 to about 75,000 cubic centimeters, about 19,418 to about 50,000 cubic centimeters, about 50,000 to about 268,436 cubic centimeters, and about 75,000 to about 268,436 cubic centimeters. Even further in another embodiment, the water purification device has a volume range of about 155,349 to about 5,126,529 cubic centimeters, about 155,349 to about 4,000,000 cubic centimeters, about 155,349 to about 3,000,000 cubic centimeters, about 155,349 to about 2,500,000 cubic centimeters, about 4,000,000 to about 5,126,529 cubic centimeters, about 3,000,000 to about 5,126,529 cubic centimeters, and about 2,000,000 to about 5,126,529 cubic centimeters.

Figure 3:
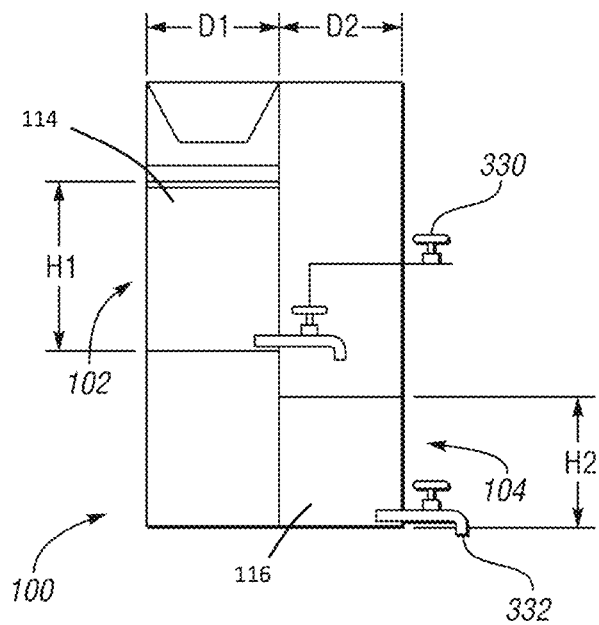
FIG. 3 depicts a cross-sectional view of another variation to a water purification device.
Figure 4:
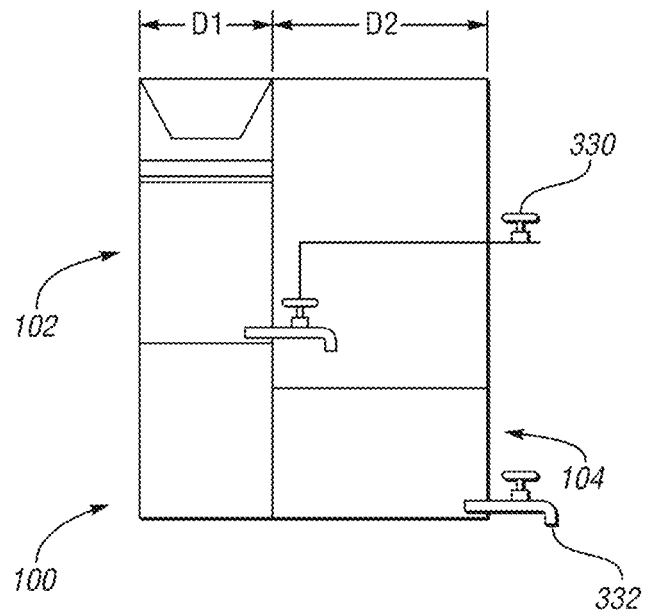
FIG. 4 depicts a cross-sectional view of yet another variation to a water purification device.

The water purification device 100 of FIG. 3 shows a variation to the water purification device 100 of FIG. 1E. In this design, the first chamber 102 is positioned, in its entire height "H1", above the second chamber 104. Desirable dwell time for the water in the first chamber 102 may be determined according to various parameters, including the height "H1" of the first chamber 102 and the cross-sectional diameter "D1" of the first chamber 102, among others. Prior to the desirable dwell time is reached, a control valve 330, which is accessible from outside of the device 100, stays closed to prevent water flow into the second chamber 104. Similarly, desirable dwell time for the water in the second chamber 104 may also be determined by the height "H2" and cross-sectional diameter "D2" of the second chamber 104. Within the spirit of the water purification device 100 being employed for "point of use" and with dimensions suitable for portable applications, values "H1", "H2", "D1", and "D2" can suitably vary. For instance, "H1" can be equal to, greater than, or less than "H2". "D1" can be equal to, greater than, or less than "D2". In certain instances, and as depicted in FIG. 4, the water purification device 100 has a wider second chamber 104 than the one of FIG. 3.

Figure 6:
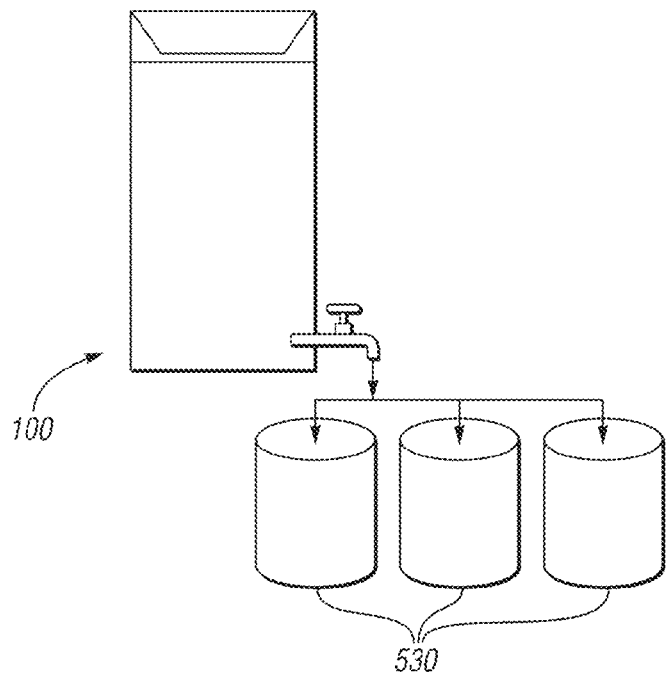
FIG. 6 depicts a cross-sectional view of yet another variation to a water purification device.
Figure 7:
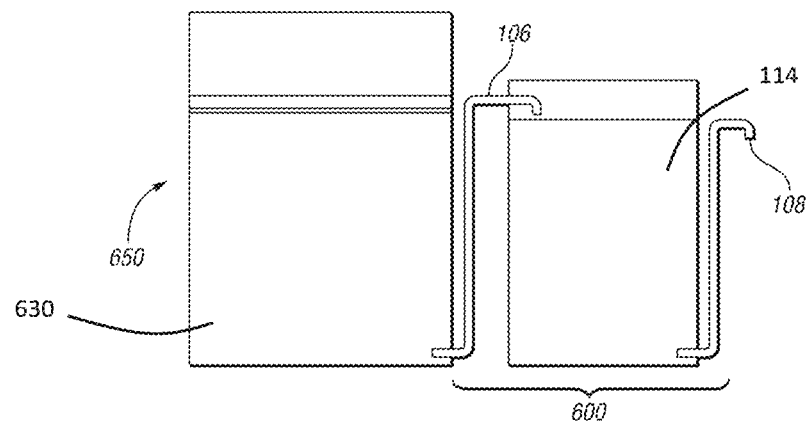
FIG. 7 depicts a cross-sectional view of a variation to a water purification device.

In yet another embodiment, and as depicted in FIG. 6, a water purification device 100 includes only the biocidal chamber 104, but in a larger version with greater value for "D2". This device 100 is designed to be charged with water, left overnight with 8 to 12 hour dwell time and discharged into one or more buckets 530 the next morning. Consumers gather water from the buckets 530 and refill the device 100 after the discharge. The refill can be carried out one or more times a day as long as desirable dwell time is achieved to ensure water quality. This device 100 may have a greater total dry weight of 50 to 200 pounds, 75 to 150 pounds, 85 to 125 pounds, 90 to 120 pounds, or 95 to 115 pounds.

Figure 9A:
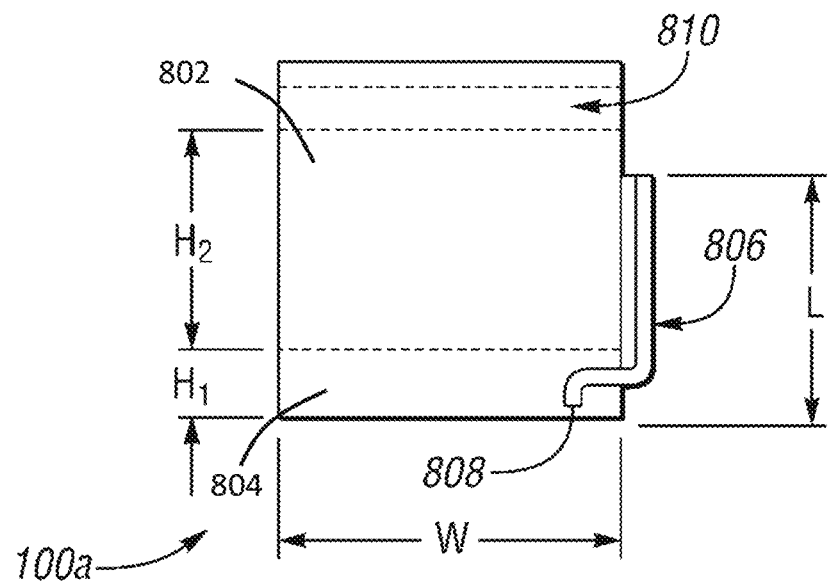
FIG. 9A depicts a cross-sectional view of a variation to a water purification device.

In yet another embodiment, and as depicted in FIG. 9A, a water purification device 100a is provided for community use, or alternatively referred to as the "community unit 100a." As referenced herein elsewhere, the lower portion 804 includes porous ceramic particles or inorganic non-ceramic-particles having a relatively greater average particle size relative to the porous ceramic particles or inorganic non-ceramic-particles contained within the upper portion 802. The community unit 100a may have any dimension suitable for community use. In certain instances, the community unit 100a has one or more of the following dimensions: a unit width/diameter "W" of 41 to 51, 43 to 49, or 45 to 47 inches, a unit height "$H_2$" for the upper portion 802 of the biocidal particles of 35 to 41, 36 to 40, or 37 to 39 inches, a unit height "$H_1$" for the lower portion 804 of the base particles of 3 to 9, 4 to 8, or 5 to 7 inches, and a dry total weight of 1000 to 3000 lbs, 1500 to 2500 lbs, or 1750 to 2250 lbs. A user may retrieve the treated water via a conduit 806 which has a distal end 808 received within the lower portion 804. The conduit 806 may be of any suitable height "L" from the base of the unit 100a. In certain instances, the height "L" is less than 28 inches, 25 inches, 22 inches, or 19 inches. During operation, a layer 810 of water is optionally maintained over the top of the upper portion 802.

Figure 9B:
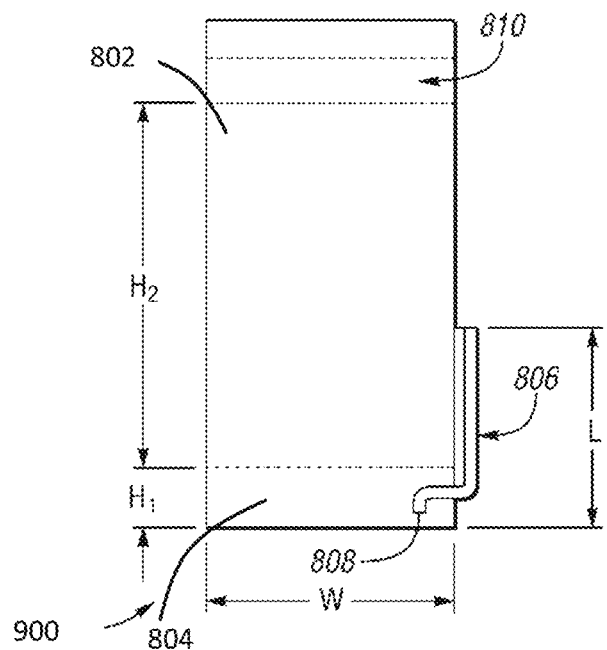
FIG. 9B depicts a cross-sectional view of a variation to a water purification device.

In yet another embodiment, and as depicted in FIG. 9B, a community unit 100b, as a variation to the community unit 100a of FIG. 9A, is provided for consumption by a community of relatively greater size. In certain instances, the community unit 100b has one or more of the following dimensions: a unit width/diameter "W" of 41 to 51, 43 to 49, or 45 to 47 inches, a unit height "$H_2$" for the upper portion 802 of the biocidal particles of 83 to 89, 84 to 88, or 85 to 87 inches, a unit height "$H_1$" for the lower portion 804 of the base particles of 3 to 9, 4 to 8, or 5 to 7 inches, and a dry total weight of 2,000 to 6,000 lbs, 3,000 to 5,000 lbs, or 3,500 to 4,500 lbs.

Figure 10:
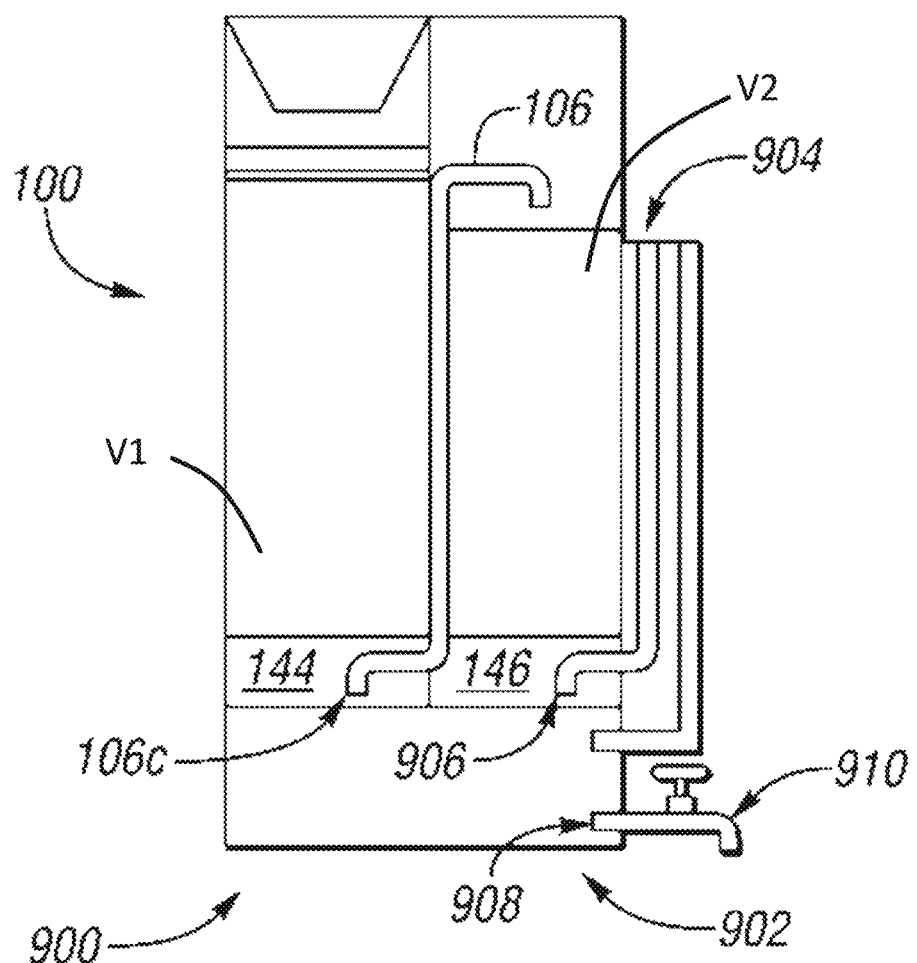
FIG. 10 depicts a cross-sectional view of a variation to a water purification device.

The water treatment/filtration device according to one or more embodiments of the present invention, such as the device 100 referenced in FIGS. 1A-1H, 2-3,7,9 and device 100a, 100b referenced in FIGS. 9A, 9B, may be used in connection with a storage unit, such as the storage unit 902 depicted in FIG. 10. For illustration purposes, FIG. 10 depicts a water treatment/filtration device 900 including a device 100 referenced in FIG. 1F detachably coupled to the storage unit 902. Water exiting from the lower portion 146 may flow to the storage unit 902 via a conduit 904. The conduit 904 has a first distal end 906 received within the lower portion 146 and a second distal end 908 received within the storage unit 902. A user may retrieve treated water from the storage unit 902 via a control valve 910. The storage unit 902 may include the same particle and biocide components employed in the first and/or second chambers, however, the amount of the porous ceramic particles or inorganic non-ceramic-particles and/or the biocide may vary depending on the water consumption demand. Without wanting to be limited to any particular theory, it is believed that ion exchange with the water provides a residual disinfection of the water within the storage unit and therefore, storing the water in the storage unit after treatment with the first and/or second chamber further reduces certain health risks. Components of the biocide may be confined within a sack with perforations, optionally made of synthetic fabric, such that flowing out of the biocide media may be reduced or event prevented, while the exchange of metal ions for disinfection purposes is largely retained.

With the storage unit, the biocide 128 components may be easily placed and contained within the safe storage unit. In certain instances, walls or external surfaces of the safe storage unit can be made of flexible materials such as plastics, water impermeable paper, or any other suitable materials. Without wanting to be limited to any particular theory, it is believed that the storage unit is not necessarily intended to allow the water to pass through but provides, quite consistently, ion exchanges of copper, zinc, and/or silver to the stored water. In certain particular instances, the storage unit may be provided as a detachable unit.

In certain instances, copper concentration in the discharged or stored water is of from 1 ppm (parts per million) to 500 ppb (parts per billion), from 500 ppb to 100 ppb, or from 99 ppb to 10 ppb. Zinc concentration in the discharged or stored water is no greater than 5.0 ppm, no greater than 2.5 ppm, of from 999 ppb to 500 ppb, or of from 499 to 100 ppb.

According to another aspect of the present invention, there is provided a water purification media kit. In one embodiment, the water purification media kit includes a plurality of porous ceramic particles and/or inorganic non-ceramic-particles mixed with at least one of a biocide, or combinations thereof, all of these components being described herein above. In certain instances, the water purification media kit includes the non-water dry contents of the second chamber 104 according to one or more embodiments in relation to FIGS. 1A-1E and 2-11. In another embodiment, the water purification media kit is individually packaged readily for application by an end user. The water purification media kit can be of any suitable packaging sizes. Non-limiting examples of the packaging sizes include 0.5 to 25 pound packages, 25 to 75 pound packages, 75 to 100 pound packages, or 100 to 200 packages, 200 to 1,000, 1500 to 2500 lb packages. The packages can be of any suitable materials, for instances, materials that are stress-resistant, chemical-inert, and/or water proof. Non-limiting packaging materials include synthetic fibers, plastics, polymers, waxed natural fibers, leather, woven poly bulk sacks and combinations thereof.

In yet another embodiment, the water purification media may include non-porous porous ceramic particles and/or inorganic non-ceramic-particles supplemented with one or more biocides, pH modifiers, and/or toxic metal absorbers described herein. In certain particular instances, the water purification composition includes sand as the non-porous inorganic particles and a plurality of silver, copper, and/or zinc rods, flakes, needles, granules, or the like.

The water purification media kit as described herein can be used in conjunction with any existing technologies. For instances, and depicted in FIG. 7, the water purification composition can be purchased by an end user and disposed in a suitable container together forming a water filtration chamber 602. The water filtration chamber 602, along with first and second conduits 106, 108, forms a water filtration add-on kit 600. The water filtration add-on kit can be attached to any existing water treatment unit 650 that consumers might already have in their possession yet with unsatisfactory filtration efficiency. The existing water treatment unit 650 may include fine sand 630. Non-limiting examples of the existing water treatment unit 650 may include those known as slow sand filtration devices, Biosand devices, and the like. The water filtration add-on kit according to one or more embodiments of the present invention provides a cost-effective supplement to these existing community water filtration systems to improve water quality. This is particularly advantageous for those in the developing world where water quality is relatively poor and means for improving the water quality is relatively limited.

Figures 14A, 14B:
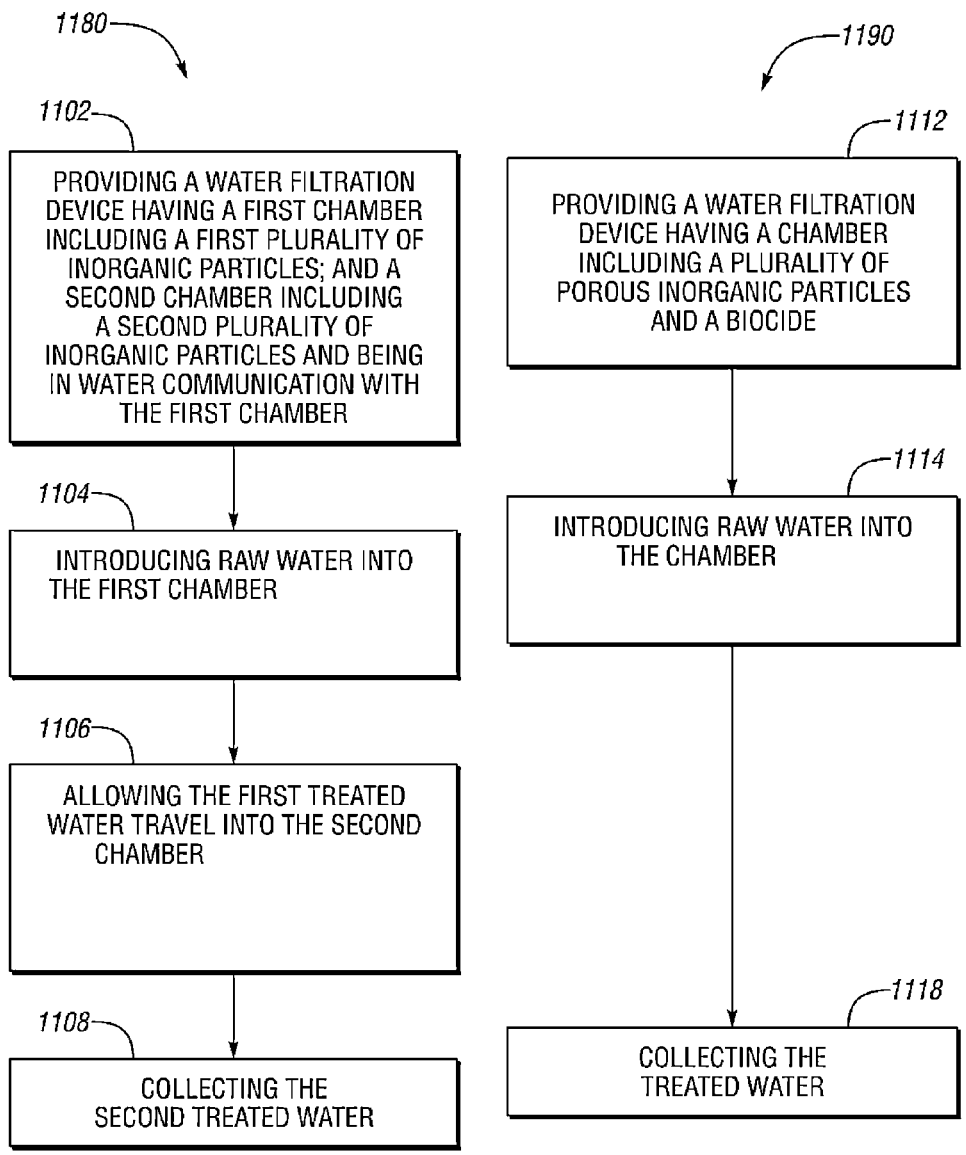
FIGS. 14A and 14B depict a method flow chart for providing drinking and cooking water.

According to another aspect of the present invention, there is a method of providing water for drinking, cooking and bathing. In one embodiment, and as depicted in FIGS. 14A and 14B, a method is generally shown at 1180. Referring to FIG. 14A, at step 1102, a water filtration device is provide to have a first chamber including a first plurality of inorganic particles, and a second chamber including a second plurality of inorganic particles and being in water communication with the first chamber. At step 1104, raw water is introduced into the first chamber. At step 1106, the first treated water is allowed to travel into the second chamber. At step 1108, the second treated water is collected for drinking, cooking, and bathing. Method 1180 represents a water filtration method employing a water filtration device having two or more chambers as described herein elsewhere.

In another embodiment, and as depicted in FIG. 14B, a method is generally shown at 1190 presents a variation to the method 1180. Method 1190 represents a water filtration method employing a water filtration device having a single chamber design as described herein elsewhere. At step 1112, a water filtration device is provided to have a chamber including a plurality of porous inorganic particles and a biocide. At step 1114, raw water is introduced into the chamber. At step 1118, the treated water collected for drinking, cooking, and bathing.

In providing additional description to one or more embodiments of the present invention, the following examples are non-limiting.

EXAMPLES

Example 1

A sample water purification device is constructed according to FIGS. 1A-1E with parameters specified below. This sample device is 22 inches in height and 14 inches in diameter. The first outlet of the first discharge conduit is 15 inches above the base and the second outlet of the second discharge conduit is 13 inches above the base. Both the first and second chambers include 5×30 porous ceramic particles. The second chamber further includes, as a biocidal agent, silver powder, copper powder, and copper sulfate. In addition, the second chamber also includes, as a pH modifier, calcium carbonate. The entire device is about 53 pounds in total dry weight.

Example 2

A sample water purification device is constructed according to FIGS. 1A-1E with parameters specified below. This sample device is 22 inches in height and 14 inches in diameter. The first outlet of the first discharge conduit is 15 inches above the base and the second outlet of the second discharge conduit is 13 inches above the base. Both the first and second chambers include 24×48 porous ceramic particles with a sub layer, positioned in the areas 144 and 146 or 154 and 158, of ½"×6 porous ceramic particles to prevent migration and undesired discharge of smaller particles from the unit. The second chamber further includes, as a biocidal agent, silver powder, copper powder, zinc alloy and copper sulfate. In addition, the second chamber also includes, as a pH modifier, calcium carbonate. The entire device is about 60 pounds in total dry weight.

Example 3

A sample water purification device is constructed substantially according to the one of Example 2, with the exception that no calcium carbonate is included in the device.

Example 4

A sample water purification device is constructed substantially according to the one of Example 2, with the exception that both chambers each include a biocide and no calcium carbonate is included in the device.

Example 5

A sample water purification device is constructed according to FIG. 2 with parameters specified below. This sample device is 22 inches in height and 17 inches in diameter. The first outlet of the first discharge conduit is 15 inches above the base and the second outlet of the second discharge conduit is 13 inches above the base. Both the first and second chambers include 5×30 porous ceramic particles. The second chamber further includes, as a biocidal agent, silver powder, copper powder, and copper sulfate. In addition, the second chamber also includes, as a pH modifier, calcium bicarbonate. The entire device is about 75 pounds in total dry weight.

Example 6

A sample water purification device is constructed according to FIG. 2 with parameters specified below. This sample device is 22 inches in height and 14 inches in diameter. The first outlet of the first discharge conduit is 15 inches above the base and the second outlet of the second discharge conduit is 13 inches above the base. Both the first and second chambers include 24×48 porous ceramic particles. The second chamber further includes, as a biocidal agent, silver powder, copper powder, zinc alloy and copper sulfate. In addition, the second chamber also includes, as a pH modifier, calcium bicarbonate. The entire device is about 90 pounds in total dry weight.

Example 7

Another sample water purification device is constructed according to FIG. 2 with parameters specified below. This sample device is 22 inches in height and 14 inches in diameter. The first outlet of the first discharge conduit is 15 inches above the base and the second outlet of the second discharge conduit is 13 inches above the base. Both the first and second chambers include 24×48 porous ceramic particles with a sublayer at the base of each chamber of ½"×6 porous ceramic particles to prevent migration and discharge of particles from the device. The second chamber further includes, as a biocidal agent, silver powder, copper powder, Zinc alloy and copper sulfate. In addition, the second chamber also includes calcium bicarbonate as a pH modifier and other agents including iron oxide, manganese oxide, bone meal, iron ore, metal fillings, positive and negatively charged resin, aluminum hydroxide, aluminum oxide and combinations thereof.

Example 8

Another sample water purification device is constructed substantially according to the one of Example 7, with the exception that the sample device has a diameter of 14 inches.

Example 9

Another sample water purification device is constructed according to FIG. 6 with parameters specified below. This sample device is 22 inches in height and 18 inches in diameter. The second and the only chamber includes 24×48 porous ceramic particles. The second chamber further includes, as a biocidal agent, silver powder, copper powder, zinc alloy and copper sulfate. In addition, the second chamber also includes calcium bicarbonate as a pH modifier. The device is about 100 pounds in total dry weight.

Example 10

Another sample water purification device is constructed according to FIG. 6 with parameters specified below. This sample device is 22 inches in height and 18 inches in diameter. The second and the only chambers include 24×48 porous ceramic particles. The second chamber further includes, as a biocidal agent, silver powder, copper powder, zinc alloy and copper sulfate. In addition, the second chamber also includes calcium bicarbonate as a pH modifier, agents including iron oxide, manganese oxide, bone meal, iron ore, metal fillings, positive and negatively charged resin, and combinations thereof. The device is about 100 pounds in total dry weight.

Examples 11 and 12

In one or more embodiments, and particularly in Examples 11 and 12, test protocols for various water analysis methods may be as follows. Relevant provisions from Standard Methods (SM) for determining total coliform counts may include SM9222B and SM9223B; for determining total $E.$ $coli$ counts may include SM9221F and SM9223B; for determining total fecal coliform counts may include SM9222D; for determining heterotrophic bacterial counts may include SM9215B; for determining water turbidity may include SM2130B and/or EPA 180.1, wherein EPA stands for United States Environmental Protection Agency; for determining pH values may include SM4500H-B; for determining viruses may include SM1601 and SM1602; for determining protozoa may include ASTM-D5916-96 (2002). Further information concerning standard methods may be obtained at http://www.standardmethods.org.

Example 11

Another sample water purification device is constructed according to the design of FIG. 1E. The first and the second containers include 5×30 porous ceramic particles. The second container includes 25 grams of ground silver, 50 grams of ground copper, suitable amount of copper sulfate, and 2000 grams of sand sized calcium carbonate. Two test methods are employed for this sample device. Total coliform and $E.$ $coli$ coliform are measured using multiple tube fermentation (MTF) method with lauryl tryptose broth and coliform ferment lactose to produce acid and gas within 48 hours at 35 degrees Celsius. Fecal coliform is measured and plated on membrane filtration method (MFM) where organisms are grown in petri dish and counted on a grid. Fecal coliform reduction efficiency is analyzed using this sample device. Ten (10) individual tests, each using a different batch of raw water, are each run on a separate day with test results tabulated in Table 3a shown below.

TABLE 3a

|  | 1st | 2nd | 3rd | 4th | 5th | 6th | 7th | 8th | 9th | 10th |
|---|---|---|---|---|---|---|---|---|---|---|
| Fecal Coliform Reduction Efficiency | 100% | 100% | 100% | 98% | 98% | 100% | 100% | 99% | 100% | 98% |
| Fecal Coliform Initial Counts | 125 | 1525 | 1300 | 1600 | 293 | 960 | 855 | 605 | 3290 | 1826 |

*E. coli* coliform reduction efficiency is also analyzed on each of the same water specimens referenced in Table 3a and results are tabulated in Table 3b shown below.

TABLE 3b

|  | 1st | 2nd | 3rd | 4th | 5th | 6th | 7th | 8th | 9th | 10th |
|---|---|---|---|---|---|---|---|---|---|---|
| *E. coli* Coliform Reduction Efficiency | 100% | 100% | 99% | 99% | 97% | 100% | 99% | 99% | 100% | 97% |
| *E. coli* Coliform Initial Counts | 60 | 600 | 625 | 900 | 98 | 319 | 328 | 250 | 900 | 1826 |

Total fecal coliform reduction efficiency is also analyzed on each of the same water specimens referenced in Table 3a and results are tabulated in Table 3c shown below.

TABLE 3c

| Test # | 1st | 2nd | 3rd | 4th | 5th | 6th | 7th | 8th | 9th | 10th |
|---|---|---|---|---|---|---|---|---|---|---|
| Total Coliform Reduction Efficiency | 100% | 100% | 99% | 97% | 97% | 100% | 99% | 98% | 99% | 95% |
| Total Coliform Initial Counts | 313 | 1600 | 1425 | 1600 | 330 | 770 | 1038 | 517 | 1600 | 1600 |

Turbidity reduction is also analyzed on each of the same water specimens referenced in Table 3a and results are tabulated in Table 3d shown below. Turbidity reduction is analyzed using this sample device. As referenced herein, the term "NTU" refers to "Nephelometric Turbidity Units" which represent light refraction of the water samples. The higher the NTU value, the cloudier and less healthy the water sample. Based on this analysis, NTU value of no greater than 5 NTUs is acceptable for drinking and cooking water uses. As can be seen from the filtration results shown in Table 3d, average NTU output values for each of the days in the analysis are well within the recommended guideline of 5 NTUs or lower according to the World Health Organization.

TABLE 3d

| Test # | 1st | 2nd | 3rd | 4th | 5th | 6th | 7th | 8th | 9th | 10th |
|---|---|---|---|---|---|---|---|---|---|---|
| Average NTU Input | 6 | 15 | 12 | 21 | 13 | 8 | 13 | 10 | 13 | 7 |
| Average NTU Output | 1323 | 1.3 | 2.2 | 3.1 | 3.0 | 2.3 | 2.9 | 3.0 | 3.7 | 2.2 |
| Reduction Efficiency | 232x | 91% | 81% | 85% | 78% | 70% | 78% | 70% | 71% | 70% |

This sample device is also evaluated for *E. coli* reduction efficiency based on running time. A container full of raw water is placed in the sample device for a dwell period of 12-16 hours. Water output is taken 1 hour, 3 hours, and 5 hours after the completion of the dwell period and the addition of untreated raw water to keep the container full at any time point. Addition of untreated raw water causes the device to discharge treated water, as the internal volume of the device is generally kept constant. The evaluation is repeated and corresponding *E. coli* reduction efficiency is recorded in Table 6e shown below. As can be seen from Table 6e, 100% *E. coli* reduction is observed with water taken 1 hour after the 12- to 16-hour dwell period and represent the water that has been treated with the maximum benefit of the dwell time. Untreated water introduced into the first chamber pushes water out of the second chamber. Water samples are also taken at 3-hour and 5-hour time points with an effort to evaluate water qualities of these discharged water portions. These later time points are important to examine as the corresponding water portions may involve portions of water that have had less than the original dwell time of 12 to 16 hours. As can be seen from Table 3e, this sample device is able to produce purified water with acceptable quality in *E. coli* reduction.

Values for water taken 3 hours or 5 hours after the initial 12- to 16-hour dwell period show minor degree of decrease in *E. coli* reduction efficiency, yet are still well within the safe drinking water guidelines as prescribed by the WHO. Without wanting to be limited to any particular theory, it is believed that the decrease in *E. coli* reduction efficiency at 3-hour and 5-hour time marks is attributable to the fact that the bulk of the water in the filtration device at these time marks is a mixture of water having relatively higher and relatively lower dwell time.

TABLE 3e

| Test # | $1^{st}$ | $2^{nd}$ |
|---|---|---|
| 1 hour after | 100% | 100% |
| 3 hours after | 100% | 99% |
| 5 hours after | 100% | 99% |

TABLE 3e-continued

| Test # | $1^{st}$ | $2^{nd}$ |
|---|---|---|
| *E. coli* Coliform Initial Count | 60 | 328 |

Example 12

A sample water purification device is constructed according to the design of FIG. 1E. The first and the second containers include 5×30 porous ceramic particles. The second container includes 25 grams of ground silver, 250 grams of ground copper, suitable amount of copper sulfate, and 4000 grams of sand sized calcium carbonate. Fecal coliform reduction efficiency is analyzed using this sample device. Twelve (12) individual tests are each run on a separate day with test results tabulated in Table 4a shown below.

TABLE 4a

| Test # | $1^{st}$ | $2^{nd}$ | $3^{rd}$ | $4^{th}$ | $5^{th}$ | $6^{th}$ | $7^{th}$ | $8^{th}$ | $9^{th}$ | $10^{th}$ | $11^{th}$ | $12^{th}$ |
|---|---|---|---|---|---|---|---|---|---|---|---|---|
| Fecal Coliform Reduction Efficiency | 100% | 100% | 98% | 100% | 99% | 100% | 100% | 100% | 100% | 99% | 100% | 100% |
| Fecal Coliform Initial Counts | 600 | 992 | 1275 | 679 | 1900 | 657 | 3175 | 850 | 1685 | 718 | 428 | 1050 |

*E. coli* coliform reduction efficiency is also analyzed on each of the same water specimens referenced in Table 4a and results are tabulated in Table 4b shown below.

TABLE 4b

|  | $1^{st}$ | $2^{nd}$ | $3^{rd}$ | $4^{th}$ | $5^{th}$ | $6^{th}$ | $7^{th}$ | $8^{th}$ | $9^{th}$ | $10^{th}$ | $11^{th}$ | $12^{th}$ |
|---|---|---|---|---|---|---|---|---|---|---|---|---|
| *E. coli* Coliform Reduction Efficiency | 100% | 100% | 99% | 99% | 99% | 99% | 100% | 100% | 100% | 99% | 100% | 100% |
| *E. coli* Coliform Initial Counts | 220 | 325 | 700 | 293 | 767 | 470 | 1725 | 350 | 722 | 260 | 238 | 663 |

Total coliform reduction efficiency is also analyzed on each of the same water specimens referenced in Table 4a and results are tabulated in Table 4c shown below.

TABLE 4c

| Test # | $1^{st}$ | $2^{nd}$ | $3^{rd}$ | $4^{th}$ | $5^{th}$ | $6^{th}$ | $7^{th}$ | $8^{th}$ | $9^{th}$ | $10^{th}$ | $11^{th}$ | $12^{th}$ |
|---|---|---|---|---|---|---|---|---|---|---|---|---|
| Total Coliform Reduction Efficiency | 100% | 100% | 97% | 99% | 99% | 99% | 100% | 100% | 100% | 99% | 100% | 99% |
| Total Coliform Initial Counts | 900 | 737 | 1600 | 687 | 1600 | 1075 | 3675 | 1275 | 2525 | 1080 | 1413 | 1500 |

Turbidity reduction is also analyzed on each of the same water specimens referenced in Table 4a and results are tabulated in Table 4d shown below. As can be seen from the filtration results shown in Table 4d, average NTU output values for each of the days in the analysis are well within the recommended guideline of 5 NTUs or lower according to the World Health Organization.

TABLE 4d

| Test # | 1st | 2nd | 3rd | 4th | 5th | 6th | 7th | 8th | 9th | 10th | 11th | 12th |
|---|---|---|---|---|---|---|---|---|---|---|---|---|
| Average NTU Input | 5.2 | 5.5 | 5.7 | 6.1 | 27.8 | 6.8 | 4.7 | 6.9 | 5.5 | 5.8 | 5.5 | 6.4 |
| Average NTU Output | 139 | 1 | 0.8 | 0.5 | 2.4 | 1.2 | 0.7 | 1.1 | 1.9 | 0.8 | 1.0 | 1.2 |
| Reduction Efficiency | 26.7x | 83% | 87% | 91% | 91% | 82% | 86% | 85% | 67% | 86% | 83% | 81% |

This sample device is also evaluated for *E. coli* reduction efficiency based on running time. A container full of raw water is placed in the sample device for a dwell period of 12 to 16 hours. Water output is taken 1 hour, 3 hours, and 5 hours after the completion of the dwell period and the addition of untreated raw water to keep the container full at any time point.

The evaluation is repeated on a different day and corresponding *E. coli* reduction efficiency is recorded in Table 4e shown below. As can be seen from Table 4e, 100% *E. coli* reduction is observed with water taken 1 hour after the 12- to 16-hour dwell period and represent the water that has been treated with the maximum benefit of the dwell time. Values for water taken 3 hours or 5 hours after the initial 24-hour dwell period show no substantial degree of decrease in *E. coli* reduction efficiency.

TABLE 4e

| Test # | 1st | 2nd |
|---|---|---|
| 1 hour after | 99.8% | 100.0% |
| 3 hours after | 99.6% | 99.7% |

TABLE 4e-continued

| Test # | 1st | 2nd |
|---|---|---|
| 5 hours after | 99.8% | 99.4% |
| *E. coli* Coliform Initial Count | 1725 | 722 |

Example 13

Two chambers, both combining biocide with porous ceramic particles—this is applicable to each of the following charts and sections. Each chamber contains a layer at the base of ½"×6, balance of chamber contains a mixture of 24×48 porous ceramic particles and the following biocide components in 798 grams of copper, 100 grams of zinc, 7.5 grams of silver, 2.5 grams of copper sulfate.

TABLE 5a

|  | Day 1 | Day 2 | Day 3 | Day 10 | Day 11 | Day 14 | Day 15 | Day 16 | Day 18 |
|---|---|---|---|---|---|---|---|---|---|
| Total Coliform reduction efficiency | 100% | 100% | 99.5% | 99.4% | 100% | 100% | 100% | 100% | 100% |
| Total Coliform Initial Counts | 1400 | 800 | 700 | 840 | 700 | 1000 | 800 | 2000 | 700 |

TABLE 5b

|  | Day 1 | Day 2 | Day 3 | Day 10 | Day 11 | Day 14 | Day 15 | Day 16 | Day 18 |
|---|---|---|---|---|---|---|---|---|---|
| *E. coli* reduction efficiency | 100% | 100% | 99.8% | 100% | 100% | 100% | 100% | 100% | 100% |
| *E. coli* Initial Counts | 600 | 300 | 1500 | 420 | 300 | 500 | 350 | 1400 | 320 |

TABLE 5c

|  | Day 1 | Day 2 | Day 3 | Day 10 | Day 11 | Day 14 | Day 15 | Day 16 | Day 18 |
|---|---|---|---|---|---|---|---|---|---|
| Fecal Coliform reduction efficiency | 100% | 100% | 99.92% | 100% | 100% | 100% | 100% | 100% | 100% |
| Fecal Coliform Initial Counts | 900 | 500 | 2400 | 740 | 500 | 800 | 600 | 1800 | 480 |

Example 14

Two chambers, both combining biocide with porous ceramic particles—this is applicable to each of the following charts and sections. Each chamber contains a layer at the base of ½"×6, balance of chamber contains a mixture of 24×48 porous ceramic particles. Both chambers each include the following biocide components in 798 grams of copper, 100 grams of zinc, 7.5 grams of silver, and 2.5 grams of copper sulfate. Efficiency is reported after 20 liters of water is processed through the device. Without wanting to be limited to any particular theory, this example supports the so-called Cation Web Matrix Theory as described herein, wherein, as shown here, the device becomes much more effective over time, 60 days after testing its 100% effective after 20 liters on all three water testing indicator bacteria.

TABLE 6a

|  | Day 1 | Day 7 | Day 10 | Day 16 | Day 24 | Day 31 | Day 40 | Day 50 | Day 59 |
| --- | --- | --- | --- | --- | --- | --- | --- | --- | --- |
| Total Coliform reduction efficiency | 99.6% | 99.7% | 100% | 99.6% | 98.9% | 99.4% | 99.6% | 100% | 100% |
| Total Coliform Initial Counts | 1400 | 1200 | 840 | 2000 | 1400 | 800 | 900 | 1200 | 2400 |

TABLE 6b

|  | Day 1 | Day 7 | Day 10 | Day 16 | Day 24 | Day 31 | Day 40 | Day 50 | Day 59 |
| --- | --- | --- | --- | --- | --- | --- | --- | --- | --- |
| *E. coli* reduction efficiency | 99.7% | 99.7% | 100% | 100% | 100% | 100% | 100% | 100% | 100% |
| *E. coli* Initial Counts | 600 | 700 | 420 | 1400 | 700 | 210 | 320 | 700 | 1300 |

TABLE 6c

|  | Day 1 | Day 7 | Day 10 | Day 16 | Day 24 | Day 31 | Day 40 | Day 50 | Day 59 |
| --- | --- | --- | --- | --- | --- | --- | --- | --- | --- |
| Fecal Coliform reduction efficiency | 99.8% | 99.8% | 100% | 100% | 100% | 100% | 100% | 100% | 100% |
| Fecal Coliform Initial Counts | 900 | 900 | 740 | 1800 | 1200 | 360 | 680 | 1000 | 2000 |

Example 15

Porous ceramic particles (negatively charged) adsorb free cations (positively charged elements) from the biocide metals, Silver, Copper & Zinc ions, with the latter two metals being the most prolific that have been exchanged with the waste water within the water purification device. To demonstrate the cation exchange increases deactivation of the microorganisms in the water purification device, the following experiment was performed.

The metal particles within the water purification device varied in size between about 1,000 to about 211 microns. A sample a portion of the ceramic media was obtained from an operating water purification device. This hydrated sample was dried, then examined with a 70× stereoscope, removing any metal particle visible that exceeded about 100 microns in diameter. After cleaning the particle the only metals that would be adsorbed to the surface of the particle would be those that had exchanged with the water through galvanic oxidation and chemical dissolution. The metallic ions of Copper and Zinc, the majority of which were smaller than about 1 micron in diameter had been adsorbed on the cation exchange sites of the particle.

The sample was dried and the ceramic portion of the mixture was separated from the metal by visual means. The separated ceramic pieces were more closely examined using a stereoscope with magnification capabilities of 70×. The ceramic granules were examined for any metallic fragments greater than 100 μm. in diameter. The ceramic granules that contained metallic fragments that were visible with the stereoscope were discarded from the analysis.

The remaining ceramic granules were analyzed by a Scanning Electron Microscope (SEM) equipped with an Energy Dispersive X-ray Spectroscopy (EDS) detector. The SEM portion of the instrument would provide visual evidence of the Zinc, Copper, and Silver, while the EDS portion of the instrument would allow for determination of concentration levels and mapping verification of the metals on the exchange sites. The ceramic granules were placed into the SEM and analyzed. A typical granule image is indicated in FIG. 12.

The previously separated granules were analyzed using EDS to determine the concentration, if any, of metallic components on the surface. A collected spectrum demonstrated the presence of Zinc and Copper on the surface of the granules. No Silver was detected. The EDS provided concentration data for chemical composition of the surface of the granule. The Copper, Zinc, and Silver data is indicated in the table below.

TABLE 7

| Component | Concentration (Mass Percentage) |
| --- | --- |
| Copper | 0.08% |
| Zinc | 0.05% |
| Silver | <0.01% |

The EDS data proves that the granules contain low levels of Copper and Zinc. The SEM and mapping portions of the instrument were used to visually show the microscopic metals on the exchange sites of the ceramic granules as shown as white specs on FIG. 13.

In one embodiment, the Cation Web Matrix Theory implies that these adsorbed microscopic metallic ions exchange from the porous particle with the cell membrane of the microorganisms (having a higher negative charge than our particle) as the microorganisms pass through the media. These ions adsorb onto the microorganisms' membrane and interfere with the respiratory process and or damage the cell membrane causing deactivation of the microorganism. The longer the water purification device operates the more effective it becomes, increasing effectiveness by about 10 to about 100 fold, from about 3 to about 5 log reduction.

Example 16

Galvanic Series Voltage Generation in the Water Purification Device

Although in at least one embodiment the water purification device will have several filtration stages without biocides or metal particles, the porous ceramic particles will have become associated with metal particles after the device is filled with waste water. The voltage within the water purification device was measured as stated below.

Utilizing a standard volt meter, within chamber 1, 1 probe was placed in the media and the $2^{nd}$ probe was placed approximately 1" above the media in the water and measured the voltage range for 60 seconds in millivolts to determine the voltage that was being generated.

TABLE 8

|  | Range (millivolts) | Average (millivolts) |
| --- | --- | --- |
| Porous Ceramic and Biocide Metals Media | 57.1-102.4 | 79.75 |

TABLE 8-continued

|  | Range (millivolts) | Average (millivolts) |
| --- | --- | --- |
| Metals Layer & Sock (start) | 887-889 | 888 |
| Metals Layer & Sock (30 minutes after start) | 987-995 | 991 |
| Metals Layer & Sock (24 hours after start) | 990-1013 | 999 |

Example 17

A water purification embodiment is disclosed that has a 3 to 5 log reduction in microorganisms. Chamber 1 has 4 filtration stages with layer 1 being closer to the top and layer 4 closer to the bottom. Each filtration layer of chamber 1 has the following characteristics.

TABLE 9a

| Layer | Volume of layer in cubic inches | Height in Inches of Chamber 1 | Lbs per inch of media in Chamber 1 | Layer density per cubic foot | Layer density per cubic inch |
| --- | --- | --- | --- | --- | --- |
| Layer 1 Cyclone Fines | 164.1 | 2.17 | 1.96 | 44.8 | .026 |
| Layer 2 10 × 50 | 653.7 | 8.66 | 2.10 | 48.2 | .028 |
| Layer 3 Biocide metals | 2.9 | .04 | 6.62 | 151.4 | .088 |
| Layer 4 Orchid Mix | 270.3 | 3.58 | 1.68 | 38.4 | .022 |
| Total | 1,091 | 14.45 |  |  |  |

Chamber 2 receives the purified water from chamber 1. Chamber 2 also has a water-permeable sock disposed within chamber 2 having the following components.

TABLE 9b

| Layer | Percent | Volume in Cubic Inches |
| --- | --- | --- |
| Copper | 87.644 | 3.1604 |
| Zinc Alloy | 7.322 | .8628 |
| Pure Zinc | 3.661 | .3345 |
| Silver | .824 | .0442 |
| Cu Sulfate | .549 | .0873 |

Example 18

A water purification embodiment is disclosed that has a 3 to 5 log reduction in microorganisms. Chamber 1 has 4 filtration stages with layer 1 being closer to the top and layer 4 closer to the bottom. Each filtration layer of chamber 1 has the following characteristics.

TABLE 10

|  | Volume of layer in cubic inches | Volume range in cubic inches | Thickness in Inches Thickness in Inches Chamber 1 | Thickness Range in inches Thickness Range in inches Chamber 1 |
|---|---|---|---|---|
| Layer 1 Cyclone Fines | 164.1 | 100-450 | 2.17 | 1.32-5.96 |
| Layer 2 10 × 50 | 649.3 | 300-1200 | 8.60 | 3.97-15.89 |
| Layer 3 Biocide metals | 2.5 | 1.5-15 | .033 | .02-.20 |
| Total | 1,086.2 | 551.5-2065 | | |

In another embodiment, the total volume of chamber 1 is about 29.5 liters and the total volume of chamber 2 is about 24.5 liters.

Example 19

In one or more embodiments test protocols for various water analysis methods may be as follows. Relevant provisions from Standard Methods (SM) for determining total coliform counts may include SM9222B and SM9223B; for determining total *E. coli* counts may include SM9221F and SM9223B; for determining total fecal coliform counts may include SM9222D; for determining heterotrophic bacterial counts may include SM9215B; for determining water turbidity may include SM2130B and/or EPA 180.1, wherein EPA stands for United States Environmental Protection Agency; for determining pH values may include SM4500H-B; for determining viruses may include SM1601 and SM1602; for determining protozoa may include ASTM-D5916-96 (2002).

A sample water filtration device is constructed according to the following parameters. The container includes the following:
Chamber 1 Pure Zinc and Zinc Alloy in Sock
Chamber 1
Screened Orchid Mix 6 lbs "approx 3.75 inches" height from bottom of device. Biocide Layer "1*a*" "113.75 grams of Biocide metals". Biocide Layer "Chamber 1*b*" approx 18.0 lbs "See Chamber 1*c* Biocide below". Biocide Layer "Chamber 1*c*" approx 5.0 lbs "See Chamber 1*d* Biocide below"

Chamber 1*a* Biocide—over Orchid Mix Layer
Biocide layer "1*a*" 94.5 g Copper #3 $\frac{1}{16}$×2 waste copper pieces, 12.5 g of Zinc alloy, 0.75 g Silver, 1.0 g Copper Sulfate, 5.0 g Small Particle Iron Oxide
Chamber "1*b*" Biocide
15.0 lbs of 10×50—Scalped processed through Kice, 927.1 g Copper #3 $\frac{1}{16}$×2 waste copper pieces, 115.5 g Zinc alloy, 9.0 g of Silver, 5.5 g Copper Sulfate, 15.0 g of Small Particle Iron Oxide,
Chamber "1*c*" Biocide layer—top 3" layer of Chamber 1
4.25 lbs of Cyclone produced Quick Dry Particles, 335.0 g Ground Copper #3 $\frac{1}{16}$×2 pieces, 42.0 g Zinc alloy, 3.0 g of Silver, 2.0 g Copper Sulfate, 5.0 g of Small Particle Iron Oxide
Chamber 2—Biocide Sock container placed under Chamber 1
239.4 g Ground Copper #3 $\frac{1}{16}$×2 pieces, 20.0 g Zinc Alloy, 10.0 g Pure Zinc, 2.25 g of Silver, 1.5 g Copper Sulfate.

Total coliform, *E. coli* coliform and fecal coliform are measured and plated on membrane filtration method (MFM) where organisms are grown in a petri dish and counted on a grid.

Fecal coliform reduction efficiency is analyzed using the sample device referenced above. Twenty-four (24) individual tests, each using a different batch of raw water, are each run on a separate day with test results tabulated in Table 3a shown below. As can be seen in Table 3a, all 24 tests provided a 100 percent reduction efficiency and yielded an average log reduction value of greater than 3.7 which exceeds the World Health Organization's minimum log reduction value for Fecal coliform of 2.0

TABLE 11a

| Test # | $1^{st}$ | $2^{nd}$ | $3^{rd}$ | $4^{th}$ | $5^{th}$ | $6^{th}$ | $7^{th}$ | $8^{th}$ | $9^{th}$ | $10^{th}$ | $11^{th}$ | $12^{th}$ |
|---|---|---|---|---|---|---|---|---|---|---|---|---|
| Fecal Coliform Reduction Efficiency (%) | 100 | 100 | 100 | 100 | 100 | 100 | 100 | 100 | 100 | 100 | 100 | 100 |
| Log Reduction Value | >3 | >4 | >3 | >3 | >3 | >2 | >4 | >4 | >4 | >4 | >4 | >4 |
| Fecal Coliform Initial Counts | 400 | 3750 | 500 | 200 | 150 | 50 | 3500 | 2450 | 3000 | 1850 | 2250 | 3800 |

| Test # | $13^{th}$ | $14^{th}$ | $15^{th}$ | $16^{th}$ | $17^{th}$ | $18^{th}$ | $19^{th}$ | $20^{th}$ | $21^{st}$ | $22^{nd}$ | $23^{rd}$ | $24^{th}$ |
|---|---|---|---|---|---|---|---|---|---|---|---|---|
| Fecal Coliform Reduction Efficiency (%) | 100 | 100 | 100 | 100 | 100 | 100 | 100 | 100 | 100 | 100 | 100 | 100 |
| Log Reduction Value | >4 | >4 | >4 | >4 | >4 | >4 | >4 | >4 | >4 | >3 | >4 | >4 |
| Fecal Coliform Initial Counts | 2550 | 2500 | 2400 | 4800 | 1200 | 1950 | 1850 | 3800 | 4850 | 3200 | 950 | 1100 |

*E. coli* coliform reduction efficiency is also analyzed on each of the same water specimens referenced in Table 11a and results are tabulated in Table 11b shown below. As can be seen in Table 11b, all 24 tests provided a 100 percent reduction efficiency and yielded an average log reduction value of greater than 3.6 which exceeds the World Health Organization's minimum log reduction value for *E. coli* of 2.0.

TABLE 11b

| Test # | $1^{st}$ | $2^{nd}$ | $3^{rd}$ | $4^{th}$ | $5^{th}$ | $6^{th}$ | $7^{th}$ | $8^{th}$ | $9^{th}$ | $10^{th}$ | $11^{th}$ | $12^{th}$ |
|---|---|---|---|---|---|---|---|---|---|---|---|---|
| *E. coli* Coliform Reduction Efficiency | 100 | 100 | 100 | 100 | 100 | 100 | 100 | 100 | 100 | 100 | 100 | 100 |
| Log Reduction Value | >3 | >4 | >3 | >3 | >2 | >2 | >4 | >4 | >4 | >4 | >4 | >4 |
| *E. coli* Coliform Initial Counts | 260 | 2100 | 300 | 120 | 70 | 20 | 2100 | 1500 | 2000 | 1200 | 1500 | 2500 |
| Test # | $13^{th}$ | $14^{th}$ | $15^{th}$ | $16^{th}$ | $17^{th}$ | $18^{th}$ | $19^{th}$ | $20^{th}$ | $21^{st}$ | $22^{nd}$ | $23^{rd}$ | $24^{th}$ |
| *E. coli* Coliform Reduction Efficiency | 100 | 100 | 100 | 100 | 100 | 100 | 100 | 100 | 100 | 100 | 100 | 100 |
| Log Reduction Value | >4 | >4 | >4 | >4 | >3 | >4 | >4 | >4 | >4 | >4 | >3 | >3 |
| *E. coli* Coliform Initial Counts | 1500 | 1400 | 1500 | 3000 | 700 | 1400 | 1200 | 2400 | 3000 | 2000 | 500 | 600 |

Total coliform reduction efficiency is also analyzed on each of the same water specimens referenced in Table 11a and results are tabulated in Table 11c shown below.

TABLE 11c

| Test # | $1^{st}$ | $2^{nd}$ | $3^{rd}$ | $4^{th}$ | $5^{th}$ | $6^{th}$ | $7^{th}$ | $8^{th}$ | $9^{th}$ | $10^{th}$ | $11^{th}$ | $12^{th}$ |
|---|---|---|---|---|---|---|---|---|---|---|---|---|
| Total Coliform Reduction Efficiency | 99.9 | 99.9 | 100 | 100 | 100 | 100 | 100 | 100 | 100 | 100 | 100 | 100 |
| Log Reduction Value | >3 | >3 | >4 | >4 | >3 | >4 | >4 | >4 | >4 | >4 | >4 | >4 |
| Total Coliform Initial Counts | 5000 | 10000 | 2000 | 2250 | 500 | 300 | 8000 | 7500 | 8000 | 5500 | 7000 | 7000 |
| Test # | $13^{th}$ | $14^{th}$ | $15^{th}$ | $16^{th}$ | $17^{th}$ | $18^{th}$ | $19^{th}$ | $20^{th}$ | $21^{st}$ | $22^{nd}$ | $23^{rd}$ | $24^{th}$ |
| Total Coliform Reduction Efficiency | 100 | 100 | 100 | 99.9 | 100 | 99.8 | 100 | 100 | 100 | 99.9 | 100 | 100 |
| Log Reduction Value | >4 | >4 | >4 | >3 | >4 | >2 | >4 | >4 | >4 | >3 | >4 | >4 |
| Total Coliform Initial Counts | 8000 | 7000 | 6000 | 8500 | 5500 | 4550 | 4450 | 9500 | 8000 | 7750 | 7000 | 6000 |

Turbidity reduction is also analyzed on each of the same water specimens referenced in Table 11a and results are tabulated in Table 11d shown below. As referenced herein, the term "NTU" refers to "Nephelometric Turbidity Units" which represent light refraction of the water samples. The higher the NTU value, the cloudier and less healthy the water sample. Based on this analysis, NTU value of no greater than 5 NTUs is acceptable for drinking and cooking water uses. As can be seen from the filtration results shown in Table 11d, average NTU output values for each of the days in the analysis are well within the recommended guideline of 5 NTUs or lower according to the World Health Organization.

TABLE 11d

| Test # | $1^{st}$ | $2^{nd}$ | $3^{rd}$ | $4^{th}$ | $5^{th}$ | $6^{th}$ | $7^{th}$ | $8^{th}$ | $9^{th}$ | $10^{th}$ | $11^{th}$ | $12^{th}$ |
|---|---|---|---|---|---|---|---|---|---|---|---|---|
| Average NTU Input | 2.2 | 20 | 0.9 | 0.9 | 1.1 | 2 | 0.3 | 2.5 | 2.4 | 4.5 | 4.5 | 13.5 |
| Average NTU Output | 3.5 | 1.4 | 0.6 | 0.6 | 0.5 | 3 | 0.2 | 0.3 | 0.4 | 0.3 | 0.5 | 0.5 |

TABLE 11d-continued

| Test # | 13th | 14th | 15th | 16th | 17th | 18th | 19th | 20th | 21st | 22nd | 23rd | 24th |
|---|---|---|---|---|---|---|---|---|---|---|---|---|
| Average NTU Input | 0.5 | 0.7 | 0.5 | 1.5 | 1 | 1.5 | 1.5 | 1 | 2 | 0.8 | 0.9 | 0.8 |
| Average NTU Output | 0.5 | 0.6 | 0.5 | 1.3 | 1.3 | 0.4 | 1.7 | 0.5 | 0.5 | 0.5 | 0.5 | 0.6 |

Example 20

Another water purification embodiment is disclosed that has a 4 log reduction in microorganisms. Referring to FIG. 11C, a hidden pocket (label) under chamber 1 (label) allows to secure a metal filled "sock" or "water-permeable detachable sack" for added performance and residual disinfection. The second chamber contains a sock of metals that is placed under Chamber 1 (just to conceal it), the galvanic oxidation of the metals exchanges ions of Cu, Zn and Ag with the water, this second chamber in the new design provides safe storage of processed water. The residual metal ions contained in the water after processing reduce the possibility of re-infection in the field from poor hygiene. In Chamber 1, very small particles 60×200 at the surface, this is to provide filtration of sediment and cysts, such as *Giardia*. This 3.5" layer of particles also contains biocidal metals, so no biofilm is formed in the Safe Storage unit at the surface. The next layer approximately 9" thick contains 10×50 porous ceramic particles, biocidal metals Cu, Zn, Ag and Iron Oxide. The next layer ⅛" thick, our galvanic layer is of metals only; the efficacy of the device leaps dramatically from 2 logs to 4 log reduction when the galvanic layer is present. The galvanic layer includes Cu, Zn, Ag and Iron Oxide. The final layer contains large Porous Ceramic particles without metals, approximately ¼" to ½" in diameter. Optionally, a three dimensional structure, porous, produced from nylon is placed at the mouth of the discharge pipe to prevent the migration ceramic particles into the plumbing.

Example 21

Another water purification embodiment is disclosed that has a 3 to 5 log reduction in microorganisms. Chamber 1 has 4 filtration stages with layer 1 being closer to the top and layer 4 closer to the bottom. The filtration layers of chamber 1 have the following characteristics.
Total Porosity 75%-37% Capillary and 38% Non-Capillary
The Layers—Chamber 1
layer 1 of chamber 1: Top Layer we describe as Cyclone Fines
    4.25 lbs—40×400 mesh sieves about 450 to about 35 microns in diameter
layer 2 of chamber 1: 10×50 Layer
    1. Porous Ceramic 15 lbs—10×50 mesh sieves about 1700 to about 297 microns in diameter
    2. 1262.1 g Copper—20×70 mesh sieves about 1000 to about 200 microns in diameter
    3. 157.5 g Zinc—4×70 mesh sieves about 4750 to about 200 microns in diameter
    4. 12.0 g Silver—20×70 mesh sieves about 1000 to about 200 microns in diameter
    5. 7.5 g Copper Sulfate—40×100 mesh sieves about 422 to about 150 microns in diameter
    6. 20.0 g Iron Oxide—200×635 mesh sieves about 74 to about 20 microns in diameter
layer 3 of chamber 1: Biocide Metal Layer
    1. 94.5 g Copper—20×70 mesh sieves—about 1000 to about 200 microns in diameter
    2. 12.5 g Zinc—4×70 mesh sieves—about 4750 to about 200 microns in diameter
    3. 0.75 g Silver—20×70 mesh sieves—about 1000 to about 200 microns in diameter
    4. 1.0 g Copper Sulfate—40×100 mesh sieves about 422 to about 150 microns in diameter
    5. 5.0 g Iron Oxide—200×635 mesh sieves about 74 to about 20 microns in diameter
layer 4 of chamber 1: Orchid Mix Layer—6 lbs ¼"×¾" mesh sieves about 10,000 to about 20,000 microns in diameter
Chamber 2
Biocide Metal Sock—
    1. 239.4 g Copper—20×70 mesh sieves—about 1000 to about 200 microns in diameter
    2. 30.0 g Zinc—4×70 mesh sieves—about 4750 to about 200 microns in diameter
    3. 2.25 g Silver—20×70 mesh sieves—about 1000 to about 200 microns in diameter
    4. 1.5 g Copper Sulfate—40×100 mesh sieves about 422 to about 150 microns in diameter
    5.

Example 22

Another water purification embodiment is disclosed that has a 3 to 5 log reduction in microorganisms. Chamber 1 has 2 filtration stages with layer 1 being closer to the top and layer 2 closer to the bottom.

A water purification device having a housing defining a plurality of chambers, including a first chamber, and a second chamber. The chambers are arranged in a serial relationship to another chamber. The water purification device includes a plurality of filtration stages including a first filtration stage and a second filtration stage. The first chamber has the first filtration stage and the second filtration stage. The filtration stages are arranged in a serial relationship to another filtration stage. The first filtration stage includes porous ceramic particles. The second filtration stage includes a biocide. The second chamber is in communication with the first chamber. At least 95 percent of the porous ceramic particles will pass through about 12,700 micron screen and at least 95 percent will not pass thru about 51 micron screen. The porous ceramic particles have a cation exchange capacity of 1 to 200 milliequivalents per 100 grams. The porous ceramic particles will become charged with ions from the biocide when the device is filled with water.

The addition of at least one aspect selected below may increase the effective log reduction of the water purification device up to a quarter log or more. A combination of several aspects below can increase the effective log reduction of the water purification and maintain a longer operating time frame. The aspects include: comprising at least one component selected from the group consisting of a toxic metal absorber, a pH modifier, and a plurality of inorganic-non-ceramic particles; comprising a toxic metal absorber, wherein the toxic metal absorber includes at least one component selected from the group consisting of a bone meal, metal fillings, aluminum hydroxide, aluminum oxide, iron ore, iron oxide, FeO, $Fe_3O_4$, $Fe_2O_3$, $\alpha\text{-}Fe_2O_3$, $\beta\text{-}Fe_2O_3$, $\gamma\text{-}Fe_2O_3$, $\epsilon$-Fe$_2$O$_3$, (Fe(OH)$_2$), (Fe(OH)$_3$), ($\alpha$-FeOOH), ($\beta$-FeOOH), ($\gamma$-FeOOH), ($\delta$-FeOOH), (Fe$_5$HO$_8$.4H$_2$O), FeOOH, manganese oxide, MnO, Mn$_3$O$_4$, Mn$_2$O$_3$, MnO$_2$, Mn$_2$O$_7$, positively charged and negatively charged resins, granular activated carbon and combinations thereof; and, comprising a plurality of inorganic-non-ceramic particles, wherein the plurality of inorganic-non-ceramic particles are selected from the group consisting of smectite clay, perlite, sand, vermiculite, zeolite, Fuller's earth, diatomatious earth, shale, and combinations thereof.

Continuing that a combination of several aspects which can increase the effective log reduction of the water purification and maintain a longer operating time frame: the plurality of inorganic-non-ceramic particles have a total percent porosity range about 33% to about 53%, a total percent non-capillary porosity range about 20% to about 40%, and a total percent capillary porosity range about 1.2% to about 22%; comprising porous ceramic particles have a total capillary porosity and a total non-capillary porosity in a ratio ranging from about 0.7 to about 1.3; comprising porous ceramic particles have an average surface area greater than 1,000 square meters per gram of dry weight; comprising porous ceramic particles have an average pore size ranging from about 0.1 to about 20 microns; comprising porous ceramic particles are fabricated from fired clay-based montmorillonite; and, comprising porous ceramic particles are constituted of the following elements, 42% illite±15% by dry weight, 39% quartz±15% by dry weight, and 19% opal±15% by dry weight as determined by X-ray diffraction.

Continuing that a combination of several aspects which can increase the effective log reduction of the water purification and maintain a longer operating time frame: the biocide includes at least one component selected from the group consisting of zinc, ground zinc, zinc alloys, zinc chloride, zinc oxide, silver, ground silver, silver alloys, colloidal silver, silver nitrate, silver dehydrate, copper, ground copper, copper alloys, copper sulfate, brass, iodine, a cation detergent, benzalkonium chloride, cetylpyridinium chloride, sorbic acid, benzoic acid, organic acid, bromine, nickel, aluminum, halogen and combinations thereof; comprising silver and copper, wherein a ratio of silver to copper is about 1:10 to about 1:150; comprising copper and zinc, wherein a ratio of copper to zinc is about 0.1:1 to about 10:1; comprising silver and zinc, wherein a ratio of silver to zinc is about 1:10 to about 1:100; and, comprising zinc and copper sulfate, and wherein a ratio of zinc alloy to copper sulfate is about 1:1 to about 30:1.

Continuing that a combination of several aspects which can increase the effective log reduction of the water purification and maintain a longer operating time frame: the first chamber has an upper filtration stage and a lower filtration stage, wherein the lower filtration stage has a larger average porous ceramic particle size than the upper filtration stage; comprising at least one water-permeable separating layer separating adjacent filtration stages; comprising porous ceramic particles have a density range of about 0.3 to about 2.0 grams of dry weight per cubic centimeter; one or both of the first chamber and second chamber further includes a filter, such that water passes through the filter prior to exiting the water purification device; comprising a toxic metal absorber in the second chamber; comprising a toxic metal absorber disposed within a water-permeable detachable sack; and, one or both of the first chamber and second chamber includes a toxic metal absorber positioned such that water contacts the toxic metal absorber prior to exiting water purification device.

Continuing that a combination of several aspects which can increase the effective log reduction of the water purification and maintain a longer operating time frame: the biocide is contained within a water-permeable detachable sack; comprising a toxic metal absorber, wherein the toxic metal absorber has a volume range of about 1,237 to about 6,186 cubic centimeters; the water purification device has a volume range of about 19,418 to about 268,436 cubic centimeters; the water purification device has a volume range of about 155,349 to about 5,126,529 cubic centimeters; a volume relationship of chamber 1 to chamber 2 is about 1.2 to 1±30 percent; the first filtration stage has a volume range of about 100 to about 450 cubic inches; the second filtration stage has a volume range of about 300 to about 1200 cubic inches; comprising a third filtration stage that has a volume range of about 1.5 to about 15 cubic inches; comprising a fourth filtration stage that has a volume range of about 150 to about 400 cubic inches; the plurality of filtration stages is between 3 to 30 filtration stages; a total range for all of the filtration stages has a volume range of about 300 to about 3000 cubic inches; and, comprising porous ceramic particles have a size selected from the group consisting of: about 37 to about 420 microns, about 100 to about 5,000 microns, and about 6,350 to about 19,050 microns, and the combinations thereof.

Continuing that a combination of several aspects which can increase the effective log reduction of the water purification and maintain a longer operating time frame: the first filtration stage has a layer density of about 0.01 to about 0.06 pounds per cubic inch; the second filtration stage has a layer density of about 0.01 to about 0.06 pounds per cubic inch; comprising a third filtration stage that has a layer density of about 0.035 to about 0.150 pounds per cubic inch; comprising a fourth filtration stage that has a layer density of about 0.01 to about 0.05 pounds per cubic inch; there is an intermixing of filtration stages between each adjacent filtration stage; comprising a volume range of porous ceramic particles of the first filtration stage to the second filtration stage is in the range about 1:1 to about 1:6; the biocide and further comprising porous ceramic particles have an average size, wherein the biocide average size to porous ceramic particles average size is in a ratio about 5:1 to about 1:5; and, the first filtration stage and the second filtration stage have a water volume ratio about 0.8:1 or about 1:6.

Continuing that a combination of several aspects which can increase the effective log reduction of the water purification and maintain a longer operating time frame: comprising Cu having a volume range of about 0.5 to about 8 cubic inches; comprising Zn alloy having a volume range of about 0.1 to about 2.5 cubic inches; comprising pure Zinc having a volume range of about 0.01 to about 1.5 cubic inches; comprising Ag having a volume range of about 0.01 to about 1 cubic inches; comprising Cu-sulfate having a volume range of about 0.01 to about 1 cubic inches; the biocide is in at least two filtration stages; the first filtration stages includes sand, shale, or sand and shale; the device has about 3 to about 100 chambers; biocide is contained within chamber 2; the water within the device has a charge of about 1 to about 500 millivolts; the water within the device has a charge of about 50 to about 150 millivolts; and the first chamber has a first filtration stage, a second filtration stage, a third filtration stage, and a fourth filtration stage and the first filtration stage includes porous ceramic particles, the second filtration stage includes porous ceramic particles and a biocide, the third filtration stage includes a biocide, and the fourth filtration stage includes porous ceramic particles.

It has been found that a filtration device having and maintaining at least about 40 to about 100 millivolts as measured across the waste water is effective in reducing the log number of pathogenic microorganisms from the waste water. In at least one embodiment, the biocide component placement can be important maintaining the voltage across the media layers in the water purification device. It has been identified in at least one aspect that chambers and/or filtration stages having inorganic particles intermixed with biocide is effective in maintaining effective biocidal characteristics.

Example 23

Employing a Water Purification Media Kit

At time the water purification chambers or filtration stage media may need to be changed or organic and/or inorganic matter removed from the chambers and/or filtration stages. The first chamber with the first successive filtration stages may be likely to lose effective purification and killing characteristics first due to the inorganic and organic waste water load which the media purifies before the waste water flows to the later subsequent filtration stages.

A water purification device may be fully recharged through subsequently removing the media from each chamber and/or filtration stage and replacing the media from that supplied in the kit. Alternatively, one may use a spoon to gently re-suspend the media in new water, thus, liberating an adhered inorganic/organic matter that may be embedded at in the surface of filtration stage and this suspended matter in the water can be scooped out from the water. Therefore, the media remains behind while the matter is removed through subsequent re-suspending steps.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A water purification device comprising:
a housing defining a plurality of chambers, including a first chamber, wherein the plurality of chambers are arranged in a serial relationship to one another;
a plurality of filtration stages, the first chamber having a first filtration stage and a second filtration stage, the filtration stages arranged in a serial relationship to another filtration stage, wherein the first filtration stage includes porous ceramic particles and the second filtration stage includes a biocide;
a second chamber in communication with the first chamber; and
wherein at least 95 percent of the porous ceramic particles will pass through a 20,000 micron screen and at least 95 percent will not pass thru a 20 micron screen,
the porous ceramic particles having a cation exchange capacity of 1 to 200 milli-equivalent per 100 grams, and the porous ceramic particles will become charged with ions from the biocide when the device is filled with water,
the water within the device has a charge of about 1 to about 500 millivolts.

2. The water purification device of claim 1, further comprising at least one component selected from a group consisting of a toxic metal absorber, a pH modifier, and a plurality of inorganic-non-ceramic particles.

3. The water purification device of claim 1, further comprising a toxic metal absorber, wherein the toxic metal absorber includes at least one component selected from a group consisting of a bone meal, metal fillings, aluminum hydroxide, aluminum oxide, iron ore, iron oxide, $FeO$, $Fe_3O_4$, $Fe_2O_3$, $\alpha$-$Fe_2O_3$, $\beta$-$Fe_2O_3$, $\gamma$-$Fe_2O_3$, $\epsilon$-$Fe_2O_3$, $(Fe(OH)_2)$, $(Fe(OH)_3)$, $(\alpha$-$FeOOH)$, $(\beta$-$FeOOH)$, $(\gamma$-$FeOOH)$, $(\delta$-$FeOOH)$, $(Fe_5HO_8.4H_2O)$, $FeOOH$, manganese oxide, $MnO$, $Mn_3O_4$, $Mn_2O_3$, $MnO_2$, $Mn_2O_7$, positively charged and negatively charged resins, granular activated carbon and combinations thereof.

4. The water purification device of claim 1, further comprising a plurality of inorganic-non-ceramic particles, wherein the plurality of inorganic-non-ceramic particles are selected from a group consisting of smectite clay, perlite, sand, vermiculite, zeolite, Fuller's earth, diatomatious earth, shale, and combinations thereof.

5. The water purification device of claim 1, wherein the porous ceramic particles have a total capillary porosity and a total non-capillary porosity in a ratio ranging from about 0.7 to about 1.3.

6. The water purification device of claim 1, wherein the porous ceramic particles have an average surface area greater than 1,000 square meters per gram of dry weight.

7. The water purification device of claim 1, wherein the porous ceramic particles have an average pore size ranging from about 0.1 to about 20 microns.

8. The water purification device of claim 1, wherein the porous ceramic particles are fabricated from fired clay-based montmorillonite.

9. The water purification device of claim 1, wherein the porous ceramic particles are constituted of the following elements, 42% illite±15% by dry weight, 39% quartz±15% by dry weight, and 19% opal±15% by dry weight as determined by X-ray diffraction.

10. The water purification device of claim 1, wherein the biocide includes at least one component selected from a group consisting of zinc, ground zinc, zinc alloys, zinc chloride, zinc oxide, silver, ground silver, silver alloys, colloidal silver, silver nitrate, silver dehydrate, copper, ground copper, copper alloys, copper sulfate, brass, iodine, a cation detergent, benzalkonium chloride, cetylpyridinium chloride, sorbic acid, benzoic acid, organic acid, bromine, nickel, aluminum, halogen and combinations thereof.

11. The water purification device of claim 1, further comprising silver and copper, wherein a ratio of silver to copper is about 1:10 to about 1:150.

12. The water purification device of claim 1, further comprising copper and zinc, wherein a ratio of copper to zinc is about 0.1:1 to about 10:1.

13. The water purification device of claim 1, further comprising silver and zinc, wherein a ratio of silver to zinc is about 1:10 to about 1:100.

14. The water purification device of claim 1, further comprising zinc and copper sulfate, wherein a ratio of zinc alloy to copper sulfate is about 1:1 to about 30:1.

15. The water purification device of claim 1, wherein the first chamber has an upper filtration stage and a lower filtration stage, wherein the lower filtration stage has a larger average porous ceramic particle size than the upper filtration stage.

16. The water purification device of claim 1, further comprising at least one water-permeable separating layer separating adjacent filtration stages.

17. The water purification device of claim 1, wherein the porous ceramic particles have a density range of about 0.3 to about 2.0 grams of dry weight per cubic centimeter.

18. The water purification device of claim 1, wherein one or both of the first chamber and second chamber further includes a filter, such that water passes through the filter prior to exiting the water purification device.

19. The water purification device of claim 1, further comprising a toxic metal absorber in the second chamber.

20. The water purification device of claim 1, further comprising a toxic metal absorber disposed within a water-permeable detachable sack.

21. The water purification device of claim 1, wherein one or both of the first chamber and second chamber includes a toxic metal absorber positioned such that water contacts the toxic metal absorber prior to exiting water purification device.

22. The water purification device of claim 1, wherein the biocide is contained within a water-permeable detachable sack.

23. The water purification device of claim 1, further comprising a toxic metal absorber, wherein the toxic metal absorber has a volume range of about 1,237 to about 6,186 cubic centimeters.

24. The water purification device of claim 1, wherein the water purification device has a volume range of about 19,418 to about 268,436 cubic centimeters.

25. The water purification device of claim 1, wherein the water purification device has a volume range of about 155,349 to about 5,126,529 cubic centimeters.

26. The water purification device of claim 1, wherein a volume relationship of chamber 1 to chamber 2 is about 1.2 to 1±30 percent.

27. The water purification device of claim 1, wherein the first filtration stage has a volume range of about 100 to about 450 cubic inches.

28. The water purification device of claim 1, wherein the second filtration stage has a volume range of about 300 to about 1200 cubic inches.

29. The water purification device of claim 1, further comprising a third filtration stage that has a volume range of about 1.5 to about 15 cubic inches.

30. The water purification device of claim 1, further comprising a fourth filtration stage that has a volume range of about 150 to about 400 cubic inches.

31. The water purification device of claim 1, wherein the plurality of filtration stages is between 3 to 30 filtration stages.

32. The water purification device of claim 1, wherein a total range for all of the filtration stages has a volume range of about 300 to about 3000 cubic inches.

33. The water purification device of claim 1, wherein the porous ceramic particles have a size selected from a group consisting of: about 37 to about 420 microns, about 100 to about 5,000 microns, and about 6,350 to about 19,050 microns, and the combinations thereof.

34. The water purification device of claim 1, wherein the first filtration stage has a layer density of about 0.01 to about 0.06 pounds per cubic inch.

35. The water purification device of claim 1, wherein the second filtration stage has a layer density of about 0.01 to about 0.06 pounds per cubic inch.

36. The water purification device of claim 1, further comprising a third filtration stage that has a layer density of about 0.035 to about 0.150 pounds per cubic inch.

37. The water purification device of claim 1, further comprising a fourth filtration stage that has a layer density of about 0.01 to about 0.05 pounds per cubic inch.

38. The water purification device of claim 1, wherein there is an intermixing of filtration stages between each adjacent filtration stage.

39. The water purification device of claim 1, further comprising a volume range of porous ceramic particles of the first filtration stage to the second filtration stage is in the range about 1:1 to about 1:6.

40. The water purification device of claim 1, wherein the porous ceramic particles, wherein the biocide has an average size and the porous ceramic particles have an average size, wherein the ratio of biocide average size to the porous ceramic particles average size is between about 5:1 to about 1:5.

41. The water purification device of claim 1, wherein the first filtration stage and the second filtration stage have a water volume ratio between about 0.8:1 to about 1:6.

42. The water purification device of claim 1, further comprising Cu having a volume range between about 0.5 to about 8 cubic inches.

43. The water purification device of claim 1, further comprising Zn alloy having a volume range between about 0.1 to about 2.5 cubic inches.

44. The water purification device of claim 1, further comprising pure Zinc having a volume range between about 0.01 to about 1.5 cubic inches.

45. The water purification device of claim 1, further comprising Ag having a volume range between about 0.01 to about 1 cubic inches.

46. The water purification device of claim 1, further comprising Cu-sulfate having a volume range between about 0.01 to about 1 cubic inches.

47. The water purification device of claim 1, wherein the biocide is in at least two filtration stages.

48. The water purification device of claim 1, wherein the first filtration stages includes sand, shale, or sand and shale.

49. The water purification device of claim 1, wherein the device has between 3 to about 100 chambers.

50. The water purification device of claim 1, wherein the biocide is contained within chamber 2.

51. A water purification device comprising:
a housing defining a plurality of chambers, including a first chamber and a second chamber arranged in a serial relationship to one another;
a plurality of filtration stages, the filtration stages arranged in a serial relationship to one another, the first chamber having a first filtration stage, a second filtration stage, a third filtration stage, and a fourth filtration stage; and
wherein the first filtration stage includes porous ceramic particles, the second filtration stage includes porous ceramic particles and a biocide, the third filtration stage includes a biocide, and the fourth filtration stage includes porous ceramic particles; and
wherein at least 95 percent of the porous ceramic particles will pass thru about 20,000 micron screen and at least 95 percent will not pass thru about 20 micron screen, the porous ceramic particles have an average pore size ranging from about 0.1 to about 20 microns, the porous ceramic particles having a cation exchange capacity of 1 to 200 milli-equivalent per 100 grams, and the porous ceramic particles will become charged with ions from the biocide when the device is filled with water.

52. A water purification device comprising:
a housing defining a plurality of chambers, including a first chamber, wherein the plurality of chambers are arranged in a serial relationship to another chamber;
a plurality of filtration stages, the first chamber having a first filtration stage and a second filtration stage, the filtration stages arranged in a serial relationship to another filtration stage, wherein the first filtration stage includes porous ceramic particles and the second filtration stage includes a biocide;
a second chamber in communication with the first chamber; and
wherein
at least 95 percent of the porous ceramic particles will pass through a 12,700 micron screen and at least 95 percent will not pass thru a 51 micron screen,
the porous ceramic particles having a cation exchange capacity of 1 to 200 milli-equivalent per 100 grams, and the porous ceramic particles will become charged with ions from the biocide when the device is filled with water.

\* \* \* \* \*